US012222743B2

(12) United States Patent
Hatta et al.

(10) Patent No.: US 12,222,743 B2
(45) Date of Patent: Feb. 11, 2025

(54) LEVER DEVICE AND WORKING MACHINE

(71) Applicant: KUBOTA CORPORATION, Osaka (JP)

(72) Inventors: Kazuyuki Hatta, Osaka (JP); Yoichi Nishigori, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 18/522,717

(22) Filed: Nov. 29, 2023

(65) Prior Publication Data

US 2024/0094759 A1 Mar. 21, 2024

Related U.S. Application Data

(63) Continuation of application No. PCT/JP2022/015011, filed on Mar. 28, 2022.

(30) Foreign Application Priority Data

Jun. 24, 2021 (JP) ................................ 2021-104982

(51) Int. Cl.
*G05G 1/04* (2006.01)
*E02F 9/20* (2006.01)

(52) U.S. Cl.
CPC ............ *G05G 1/04* (2013.01); *E02F 9/2004* (2013.01)

(58) Field of Classification Search
None
See application file for complete search history.

(56) References Cited

U.S. PATENT DOCUMENTS 10,407,871 B2 * 9/2019 Nishigori ............... B60N 2/646
11,473,268 B2 * 10/2022 Nishigori .................. E02F 9/16
2020/0299931 A1 9/2020 Nishigori et al.

FOREIGN PATENT DOCUMENTS

JP 57-005327 U 1/1982
JP 57-006627 U 1/1982
JP 2019-116753 A 7/2019

* cited by examiner

*Primary Examiner* — Vicky A Johnson
(74) *Attorney, Agent, or Firm* — GREENBLUM & BERNSTEIN, P.L.C.

(57) ABSTRACT

A lever device includes a movable bracket and a lever supported on a support shaft on a base such that they are pivotable between lowered and raised positions, first engagement portion(s) on the movable bracket, second engagement portion(s) on the lever, a cam member attached to the support shaft such that it is movable in an axial direction of the support shaft but not rotatable about the support shaft, and a biasing member to bias the cam member to engage with the first and second engagement portions. When the movable bracket etc. are in the lowered position and when they are in the raised position, the first engagement portion(s) engage(s) with the cam member to restrict the movable bracket from pivoting. When the lever pivots upward from the lowered position or downward from the raised position, the second engagement portion(s) disengage(s) the cam member from the first engagement portion(s).

8 Claims, 20 Drawing Sheets

LEVER DEVICE AND WORKING MACHINE

CROSS REFERENCE TO RELATED APPLICATIONS

This application is a continuation application of International Application No. PCT/JP2022/015011, filed on Mar. 28, 2022, which claims the benefit of priority to Japanese Patent Application No. 2021-104982, filed on Jun. 24, 2021. The entire contents of each of these applications are hereby incorporated herein by reference.

BACKGROUND OF THE INVENTION

1. Field of the Invention

The present invention relates to a lever device and a working machine.

2. Description of the Related Art

A lever device disclosed in Japanese Unexamined Patent Application Publication No. 2019-116753 is known.

The lever device disclosed in Japanese Unexamined Patent Application Publication No. 2019-116753 is configured such that a movable bracket is supported on a first support shaft provided on a fixed base such that the movable bracket is rotatable between a lowered position and a raised position which is a position of the movable bracket pivoted upward from the lowered position, a lever is pivotally supported on a second support shaft on the movable bracket, and moving up or down the lever causes the movable bracket to move between the lowered position and the raised position.

SUMMARY OF THE INVENTION

The lever device disclosed in Japanese Unexamined Patent Application Publication No. 2019-116753 is large in size because the center of rotation of the lever and the center of rotation of the movable bracket differ from each other and therefore the two support shafts are required, and also because the lever device requires a mechanism between the first support shaft and the second support shaft to restrict the position of the movable bracket to the lowered position and raised position and to stop restricting the position and allow the movable bracket to pivot upon the pivoting of the lever. Furthermore, the lever device is heavy, requiring a large operating force.

Preferred embodiments of the present invention make it possible to reduce the size and weight of the lever device.

A lever device according to an aspect of the present invention includes a base, a support shaft provided on the base, a movable bracket and a lever which are supported on the support shaft such that the movable bracket and the lever are pivotable between a lowered position and a raised position, the raised position being a position of the movable bracket and the lever pivoted upward from the lowered position, at least one first engagement portion provided on the movable bracket, at least one second engagement portion provided on the lever, a cam member to engage with the at least one first engagement portion and the at least one second engagement portion, the cam member being attached to the support shaft such that the cam member is movable in a direction of an axis of the support shaft but not rotatable about the axis of the support shaft, and a biasing member to bias the cam member in a direction that allows the cam member to engage with the at least one first engagement portion and the at least one second engagement portion, wherein the at least one first engagement portion is configured to, when the movable bracket and the lever are in the lowered position and when the movable bracket and the lever are in the raised position, engage with the cam member to restrict the movable bracket from pivoting, and the at least one second engagement portion is configured such that, when the lever is caused to pivot upward from the lowered position or pivot downward from the raised position, the at least one second engagement portion causes the cam member to move against the biasing member to disengage the cam member from the at least one first engagement portion.

The cam member may include engagement recesses to receive the at least one first engagement portion and the at least one second engagement portion when the movable bracket and the lever are in the lowered position and when the movable bracket and the lever are in the raised position. At least one of the engagement recesses that receives the at least one first engagement portion may include a pivot restrictor surface to contact the at least one first engagement portion to restrict the movable bracket from pivoting. At least one of the engagement recesses that receives the at least one second engagement portion may include a cam surface to allow the at least one second engagement portion to slide thereon such that the cam member moves against the biasing member when the at least one second engagement portion pivots together with the lever.

The engagement recesses may include at least one first engagement recess to receive the at least one first engagement portion when the movable bracket and the lever are in the lowered position, at least one second engagement recess to receive the at least one second engagement portion when the movable bracket and the lever are in the lowered position, and at least one third engagement recess which does not receive the at least one first engagement portion or the at least one second engagement portion when the movable bracket and the lever are in the lowered position. When the movable bracket and the lever are in the raised position, the at least one second engagement recess may receive the at least one first engagement portion and the at least one third engagement recess may receive the at least one second engagement portion.

The lever device may include a pair of the first engagement portions and a pair of the second engagement portions. The pair of first engagement portions may be arranged symmetrically to each other with respect to a center of the support shaft. The pair of second engagement portions may be arranged symmetrically to each other with respect to the center of the support shaft.

The lever may pivot relative to the movable bracket while the at least one first engagement portion and the cam member are about to be disengaged, and pivot together with the movable bracket after the at least one first engagement portion and the cam member are disengaged.

The lever device may further include a guide slot in one of the movable bracket and the lever, and a pin provided on the other of the movable bracket and the lever and inserted in the guide slot. The guide slot may be in the form of an arc centered on the axis of the support shaft. The lever may pivot relative to the movable bracket while the pin is moving between a first end and a second end of the guide slot, and the movable bracket may pivot together with the lever when the pin is positioned at the first end or the second end of the guide slot.

A working machine according to an aspect of the present invention includes the lever device.

The lever may be an operation lock lever to switch one or more actuators in or on the working machine between an operable state and an inoperable state.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

DETAILED DESCRIPTION OF THE PREFERRED EMBODIMENTS

Figure 1:
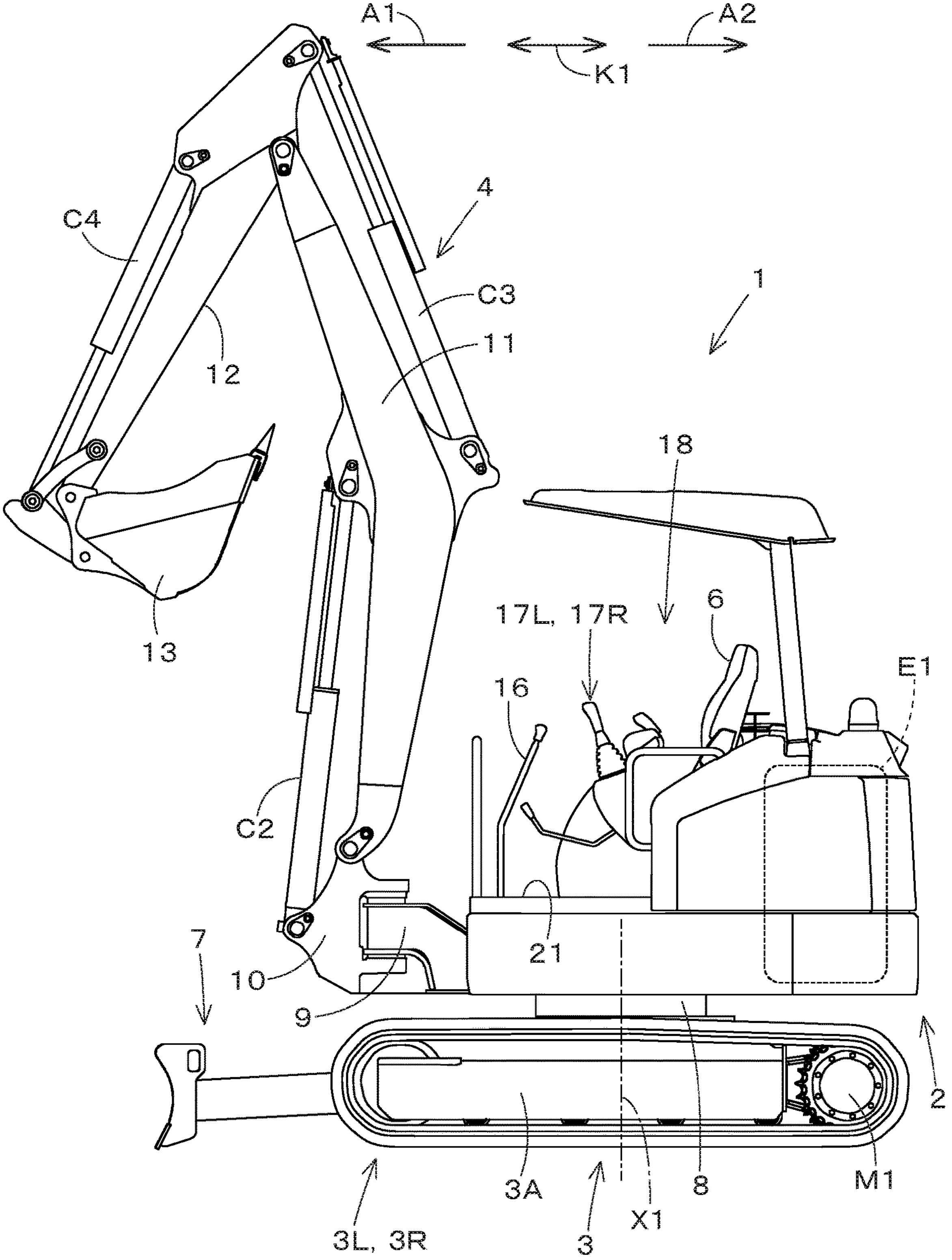
FIG. 1 is a side view of a working machine.

The preferred embodiments will now be described with reference to the accompanying drawings, wherein like reference numerals designate corresponding or identical elements throughout the various drawings. The drawings are to be viewed in an orientation in which the reference numerals are viewed correctly.

The following description discusses an embodiment of the present invention with reference to drawings as necessary.

FIG. 1 is a side view schematically illustrating a general configuration of a working machine 1 according to the present embodiment. In the present embodiment, a backhoe which is a swiveling working machine is illustrated as an example of the working machine 1.

As illustrated in FIG. 1, the working machine 1 includes a machine body (swivel base) 2, a traveling device 3, and a working device 4. The machine body 2 is provided with an operator's seat 6 on which an operator (driver) is to be seated.

In the present embodiment, a forward direction from the operator seated on the operator's seat 6 of the working machine 1 (direction indicated by arrow A1 in FIG. 1) is referred to as a forward direction (machine body forward direction), a rearward direction from the operator (direction indicated by arrow A2 in FIG. 1) is referred to as a rearward direction (machine body rearward direction), and a direction indicated by arrow K1 in FIG. 1 is referred to as a front-rear direction (machine body front-rear direction). A leftward direction from the operator (direction toward the near size in FIG. 1) is referred to as a leftward direction, and a rightward direction from the operator (direction toward the far side in FIG. 1) is referred to as a rightward direction.

A horizontal direction orthogonal to the front-rear direction K1 is referred to as a machine body width direction. A direction rightward or leftward from the widthwise center of the machine body 2 is referred to as a machine body width outward direction. That is, the machine body width outward direction is a direction going away from the widthwise center of the machine body 2 along the machine body width direction. A direction opposite to the machine body width outward direction is referred to as a machine body width inward direction. That is, the machine body width inward direction is a direction approaching the widthwise center of the machine body 2 along the machine body width direction.

As illustrated in FIG. 1, the traveling device 3 is a crawler traveling device to support the machine body 2 such that the machine body 2 is allowed to travel, and includes a travel frame 3A, a first traveling device 3L provided on the left side of the travel frame 3A, and a second traveling device 3R provided on the right side of the travel frame 3A. The first traveling device 3L and the second traveling device 3R are driven by travel motor(s) M1 including hydraulic motor(s) (hydraulic actuator(s)). In the present embodiment, the traveling device 3 is a crawler traveling device 3, but this does not imply any limitation. The traveling device 3 may be a wheel traveling device 3. The traveling device 3 has attached to a front portion thereof a dozer device 7. The dozer device 7 can be driven by a dozer cylinder including a hydraulic cylinder (hydraulic actuator).

As illustrated in FIG. 1, the machine body 2 is supported on the traveling device 3 via a swivel bearing 8 such that the machine body 2 is rotatable about a rotational axis X1 which is an axis extending in an up-and-down direction. The machine body 2 is provided, at a front portion thereof, with a support bracket 9 and a swing bracket 10 to support the working device 4. The support bracket 9 projects forward from the machine body 2. The swing bracket 10 is attached to a front portion of the support bracket 9 such that the swing bracket 10 is swingable about a vertical axis (axis extending in the up-and-down direction).

As illustrated in FIG. 1, the working device 4 includes a boom 11, an arm 12, and a bucket 13. The proximal portion of the boom 11 is attached to an upper portion of the swing bracket 10 such that the boom 11 is swingable about a lateral axis (axis extending along the machine body width direction). The arm 12 is attached to the distal portion of the boom 11 such that the arm 12 is swingable about a lateral axis. The bucket 13 is provided at the distal portion of the arm 12 such that the bucket 13 is capable of shoveling and dumping. The shoveling refers to a swinging movement of the bucket 13 toward the boom 11, and is, for example, performed to scoop earth and sand or the like. The dumping refers to a swinging movement of the bucket 13 away from the boom 11, and is, for example, performed to drop (discharge) the scooped sand or the like.

The working machine 1 can have attached thereto, instead of or in addition to the bucket 13, some other working tool (hydraulic attachment) which can be driven by a hydraulic actuator. Examples of the other working tool include hydraulic breakers, hydraulic crushers, angle brooms, earth augers, pallet forks, sweepers, mowers, and snow blowers.

The swing bracket 10 is swingable upon extension and retraction of a swing cylinder (not illustrated). The boom 11 is swingable upon extension and retraction of the boom cylinder C2. The arm 12 is swingable upon extension or retraction of an arm cylinder C3. The bucket 13 is capable of shoveling and dumping upon extension and retraction of a bucket cylinder C4. The swing cylinder, the boom cylinder C2, the arm cylinder C3, and the bucket cylinder C4 are each a hydraulic cylinder (hydraulic actuator).

As illustrated in FIG. 1, a prime mover E1 is provided at a rear portion of the machine body 2. The prime mover E1 is a diesel engine. Note that the prime mover E1 may be a gasoline engine, an electric motor, or a hybrid primo mover including an engine and an electric motor. On the machine body 2, an operator portion 18 is provided forward of the prime mover E1. The operator portion 18 includes the operator's seat 6, a traveling lever 16 located forward of the operator's seat 6, an operating device (left operating device) 17L provided leftward of the operator's seat 6, an operating device (right operating device) 17R provided rightward of the operator's seat 6, and/or the like. The traveling lever 16 is an operation member (manual operator) to operate the traveling device 3. The operating devices 17L and 17R are operated to, for example, cause the boom 11 to swing, cause the arm 12 to swing, cause the bucket 13 to shovel and dump, and/or cause the machine body 2 to rotate. The machine body 2 is provided with a step 21 which defines a floor surface at the top surface thereof and in front of the operator's seat 6.

Figure 2:
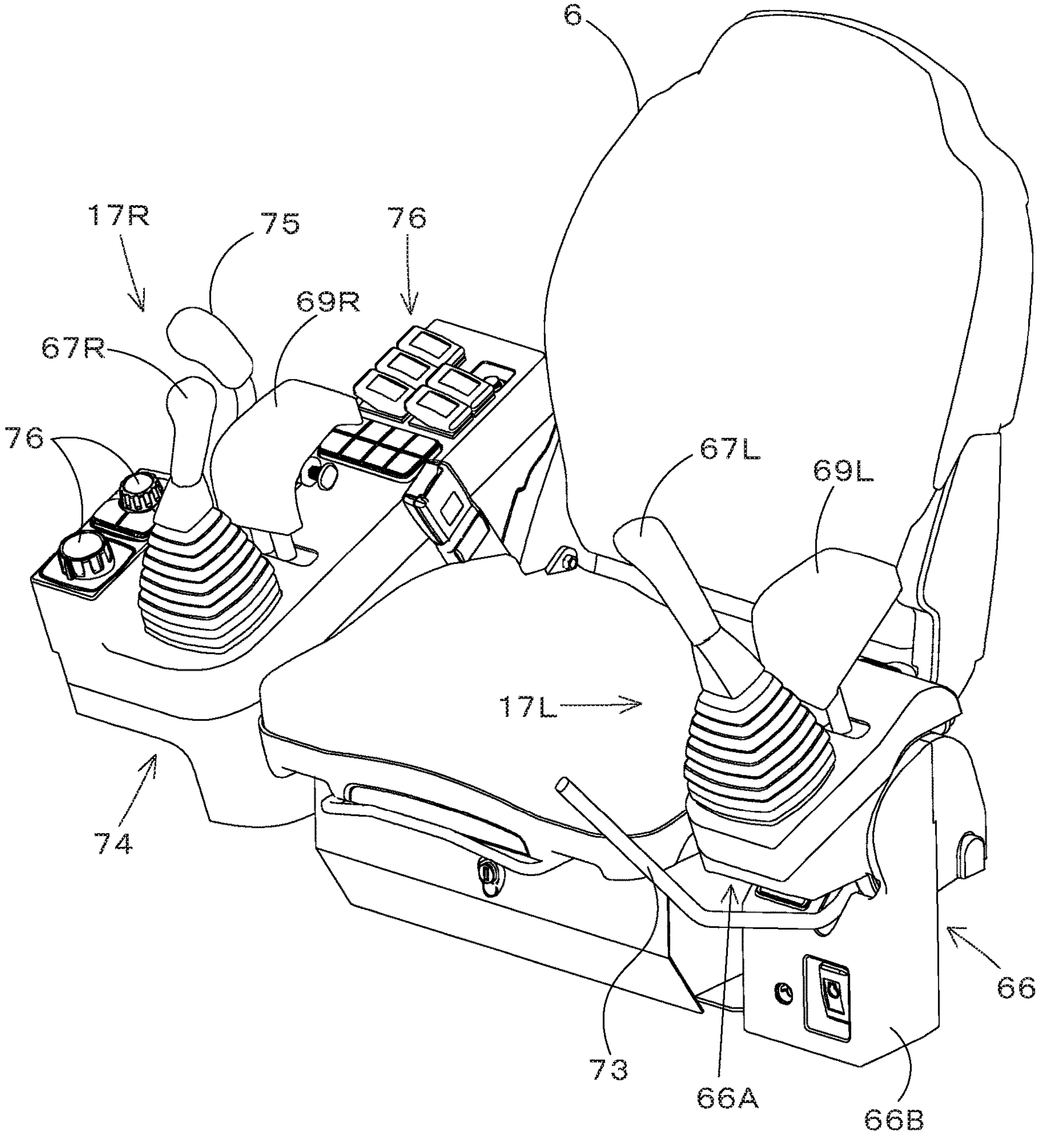
FIG. 2 is a perspective view of an operator's seat and its surroundings.
Figure 3A:
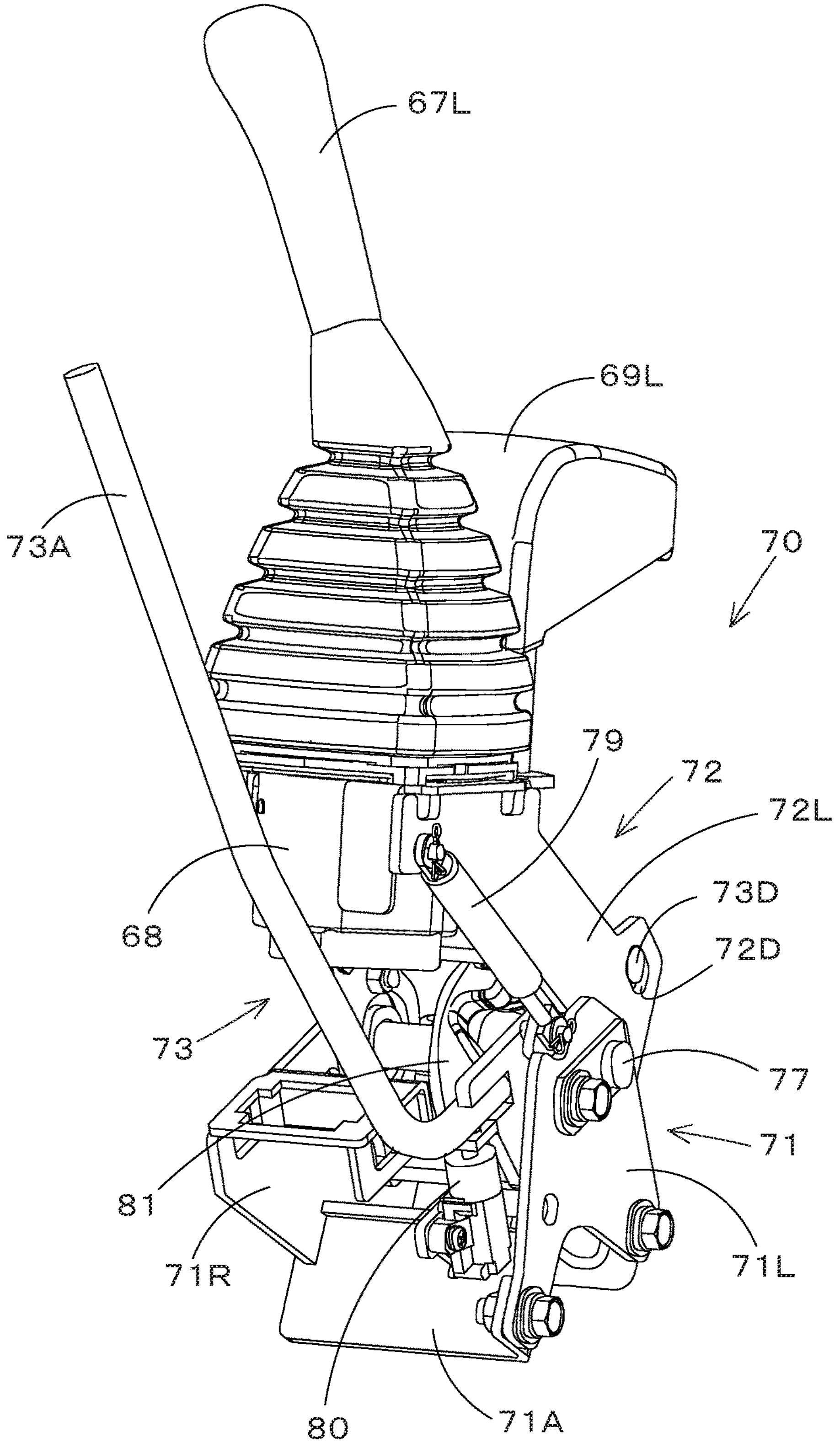
FIG. 3A is a perspective view of a front side of a lever device.

As illustrated in FIGS. 2 and 3A, the left operating device 17L, which is located leftward of the operator's seat 6, includes a console cover 66, an operating lever (left operating lever) 67L, a remote control valve 68, an armrest 69L, and a lever device 70.

The console cover 66 includes a first cover 66A and a second cover 66B. The left operating lever 67L is located at an upper front portion of the left operating device 17L and is capable of pivoting forward, backward, leftward and rightward. The remote control valve 68 is a pilot valve operated using the left operating lever 67L, and is located below the left operating lever 67L. The remote control valve 68 is housed in the first cover 66A. The armrest 69L is a member on which the operator's arm and other part(s) are placed, and is located behind the left operating lever 67L.

Figure 3B:
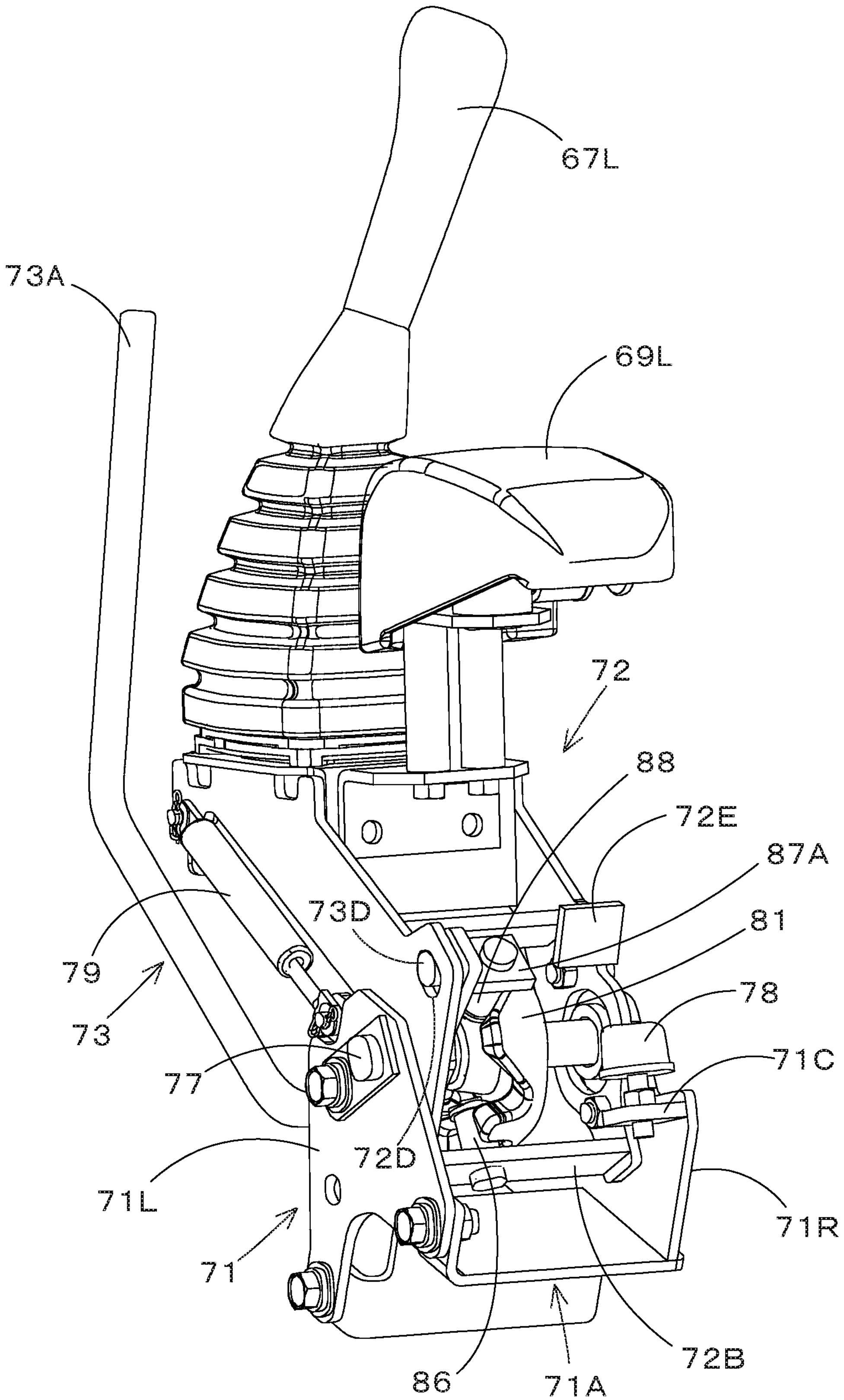
FIG. 3B is a perspective view of a rear side of the lever device.

The lever device 70 includes a base 71, a movable bracket 72, and a lever 73, as illustrated in FIGS. 3A and 3B.

As illustrated in FIG. 2, the base 71 and the movable bracket 72 are covered by the console cover 66. The first cover 66A covers the movable bracket 72 and the like and rotates together with the movable bracket 72. The lever 73 projects forward from the console cover 66.

As illustrated in FIG. 2, the right operating device 17R, which is located rightward of the operator's seat 6, includes a console cover 74, an operating lever (right operating lever) 67R, a remote control valve (not shown), an armrest 69R, a dozer lever 75, and a plurality of switches 76.

The console cover 74 covers the frame of the right operating device 17R. The frame of the right operating device 17R is attached directly or indirectly to the machine body 2. The right operating lever 67R is located at an upper front portion of the right operating device 17R and is capable of pivoting forward, backward, leftward, and rightward. The remote control valve is a pilot valve operated using the right operating lever 67R, located below the right operating lever 67R, and covered by the console cover 74. The armrest 69R is a member on which the operator's arm and other part(s) are placed, and is located behind the right operating lever 67R. The dozer lever 75 is used to operate the dozer device 7. The plurality of switches 76 are located at the top of the console cover 74 and used to operate devices provided in or on the working machine 1.

The left operating lever 67L (remote control valve 68) can be used to operate two objects (hydraulic actuators) provided in or on the working machine 1. For example, the left operating lever 67L can be used to operate the swivel motor to turn the machine body 2 (can be used to turn the machine body 2) and can be used to operate the arm cylinder C3 (can be used to swing the arm 12).

The right operating lever 67R can also be used to operate two objects (hydraulic actuators) provided in or on the working machine 1. For example, the right operating lever 67R can be used to operate the boom cylinder C2 (can be used to swing the boom 11) and can be used to operate the bucket cylinder C4 (can be used to swing the bucket 13).

The following description first schematically discusses the lever device 70 according to the present embodiment.

The lever 73 is an unloading lever (operation lock lever) to switch hydraulic actuator(s) of the working machine 1 between an operable state and an inoperable state. The lever device 70 is an unloading lever device (operation lock lever device) including the unloading lever. Therefore, the following description is based on the assumption that the lever device 70 is an unloading lever device and the lever 73 is an unloading lever. However, the lever device 70 is not limited to an unloading lever device and the lever 73 is not limited to an unloading lever. For example, the lever 73 may be an operation lock lever to switch electric actuator(s) (not shown), provided in or on the working machine 1 instead of or in addition to the hydraulic actuator(s) described above, between operable and inoperable states. The lever 73 may also be an operation lock lever to output a signal, to a controller which controls the operation of actuator(s) provided in or on the working machine 1, to switch the actuator(s) between operable and inoperable states. The lever 73 is not limited to those for use in locking the operation of actuator(s), but may be the one that is used for other purposes.

Figure 4A:
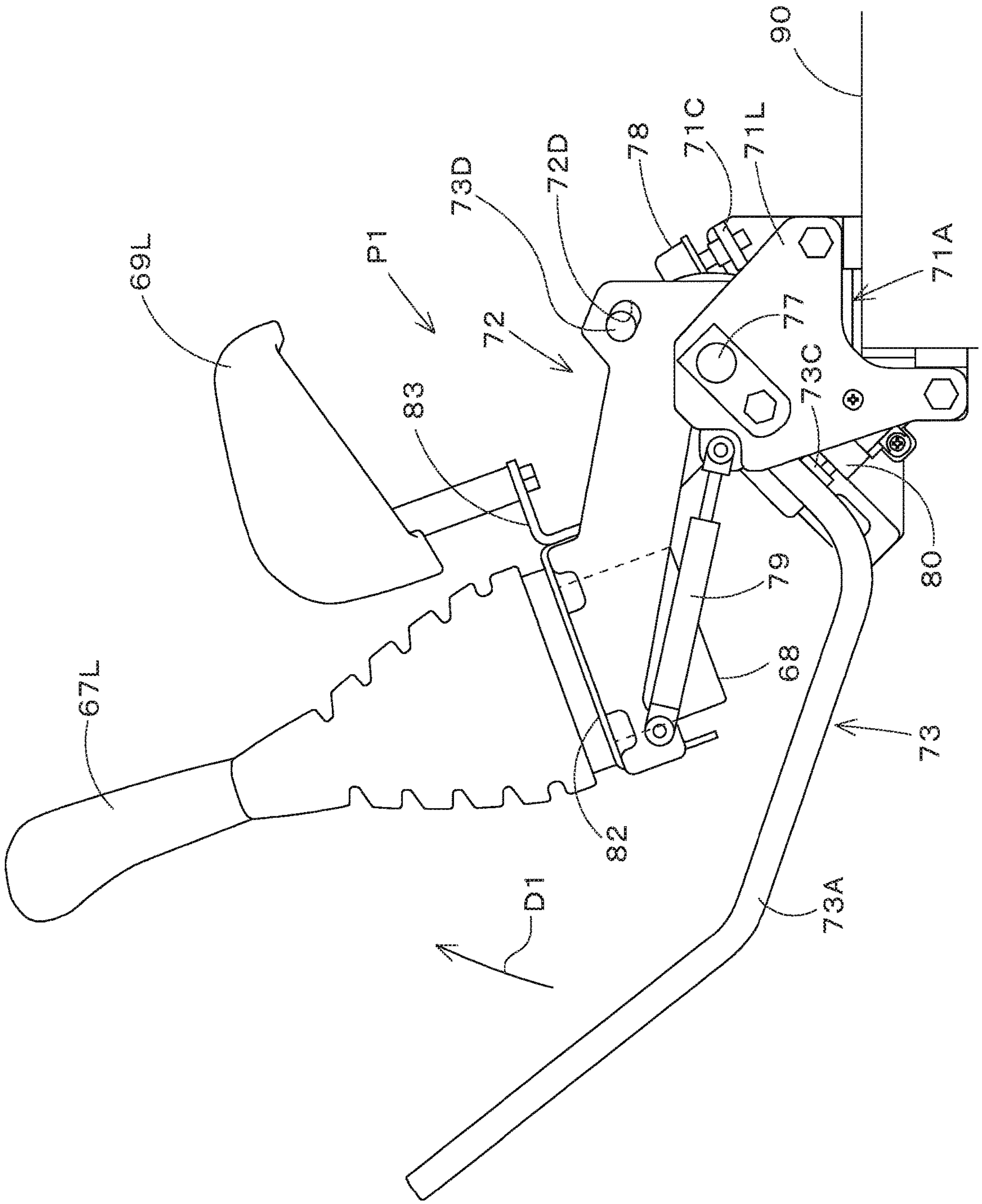
FIG. 4A is a side view of the lever device in a lowered position.

As illustrated in FIG. 4A, the base 71 is attached to a member 90 attached and secured to the machine body 2. The unloading lever 73 and the movable bracket 72 are supported on a support shaft 77 attached to the base 71 such that the unloading lever 73 and the movable bracket 72 are pivotable about an axis. The support shaft 77 is attached to the base 71 such that the support shaft 77 is not rotatable.

The movable bracket 72 has attached thereto the left operating lever 67L, the remote control valve 68, and the armrest 69L.

Figure 5A:
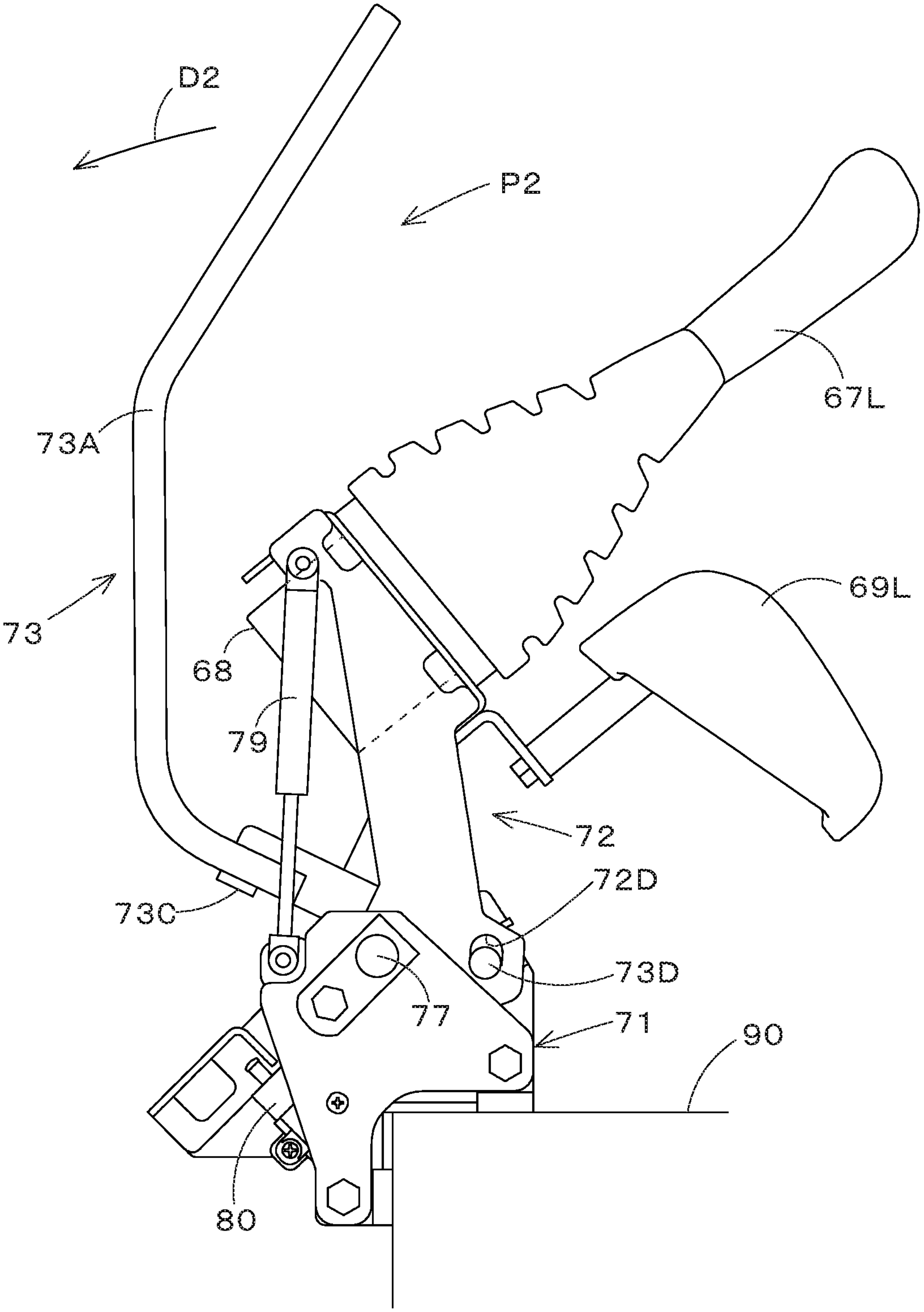
FIG. 5A is a side view of the lever device in the raised position.

The unloading lever 73 and the movable bracket 72 can be repositioned in a lowered position P1 illustrated in FIG. 4A and a raised position P2 illustrated in FIG. 5A which is a position of the unloading lever 73 and the movable bracket 72 pivoted upward from the lowered position P1 about the support shaft 77. When the unloading lever 73 and the movable bracket 72 are in the raised position P2, for example, it is not possible to operate the working device 4 (boom cylinder C2, arm cylinder C3, bucket cylinder C4) or the machine body 2 (swivel motor). When the unloading lever 73 and the movable bracket 72 are in the lowered position P1, it is possible to operate the working device 4 and turn the machine body 2.

Note that the following configuration may be used: when the unloading lever 73 and the movable bracket 72 are in the raised position P2, all or major hydraulic actuators of the working machine 1 (such as the boom cylinder C2, the arm cylinder C3, the bucket cylinder C4, the swing cylinder, the dozer cylinder, the travel motor M1, the swivel motor, and/or hydraulic actuator(s) detachably connected to service port(s)) cannot be operated, i.e., no hydraulic fluid is supplied to them.

In the following description, the direction (direction indicated by arrow D1 in FIG. 4A) in which the unloading lever 73 and the movable bracket 72 pivot upward from the lowered position P1 is referred to as upward direction D1, and the direction (direction indicated by arrow D2 in FIG. 5A) in which the unloading lever 73 and the movable bracket 72 pivot downward from the raised position P2 is referred to as downward direction D2.

Next, the unloading lever device 70 is described in detail.

Figure 3C:
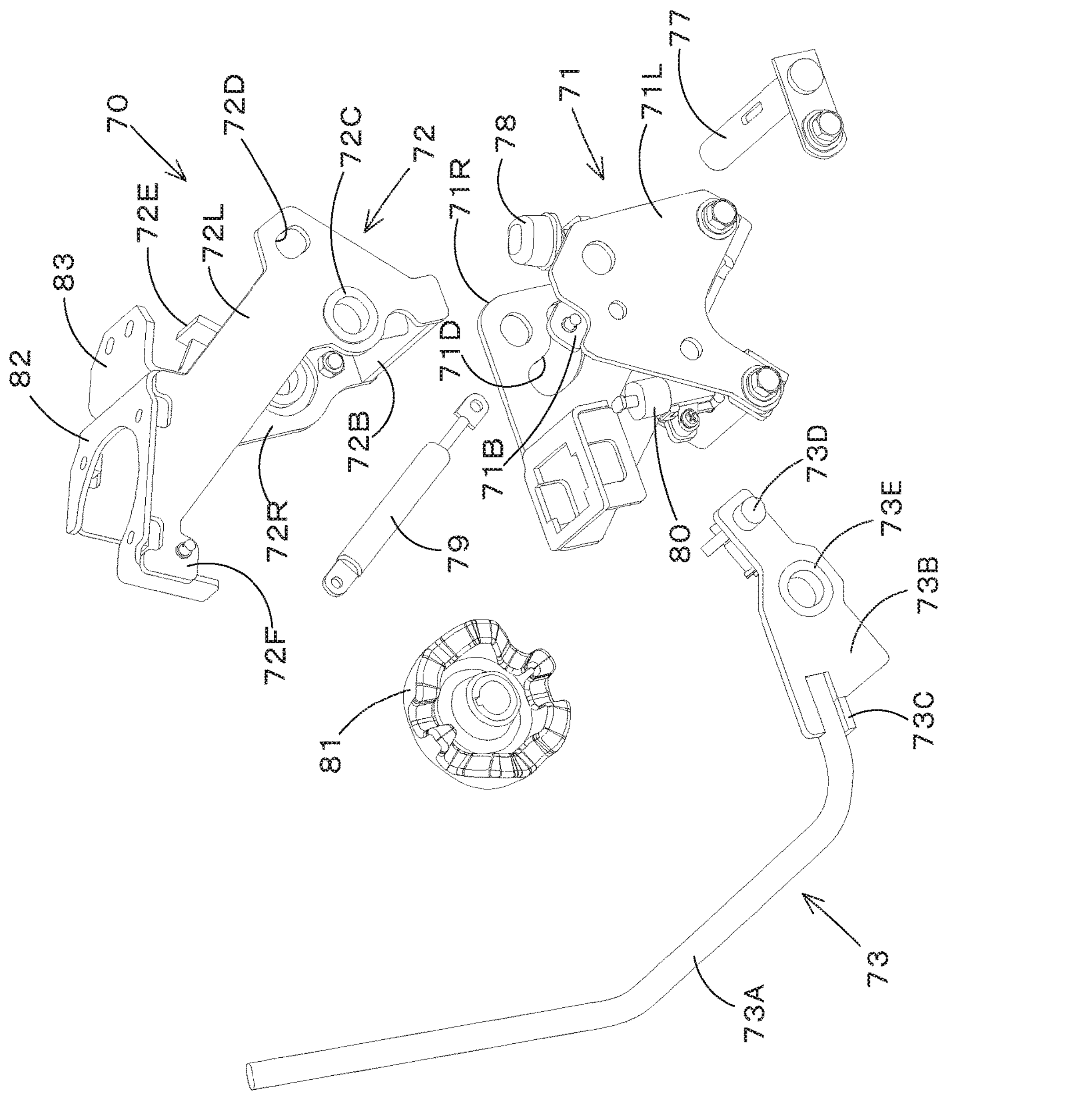
FIG. 3C is an exploded perspective view of the lever device.

As illustrated in FIGS. 3A, 3B, and 3C, the unloading lever device 70 includes the base 71, the movable bracket 72, the unloading lever 73, and the support shaft 77 described above, as well as a position restrictor 78, a biasing member 79, a detection switch 80, and a cam member 81.

Figure 6:
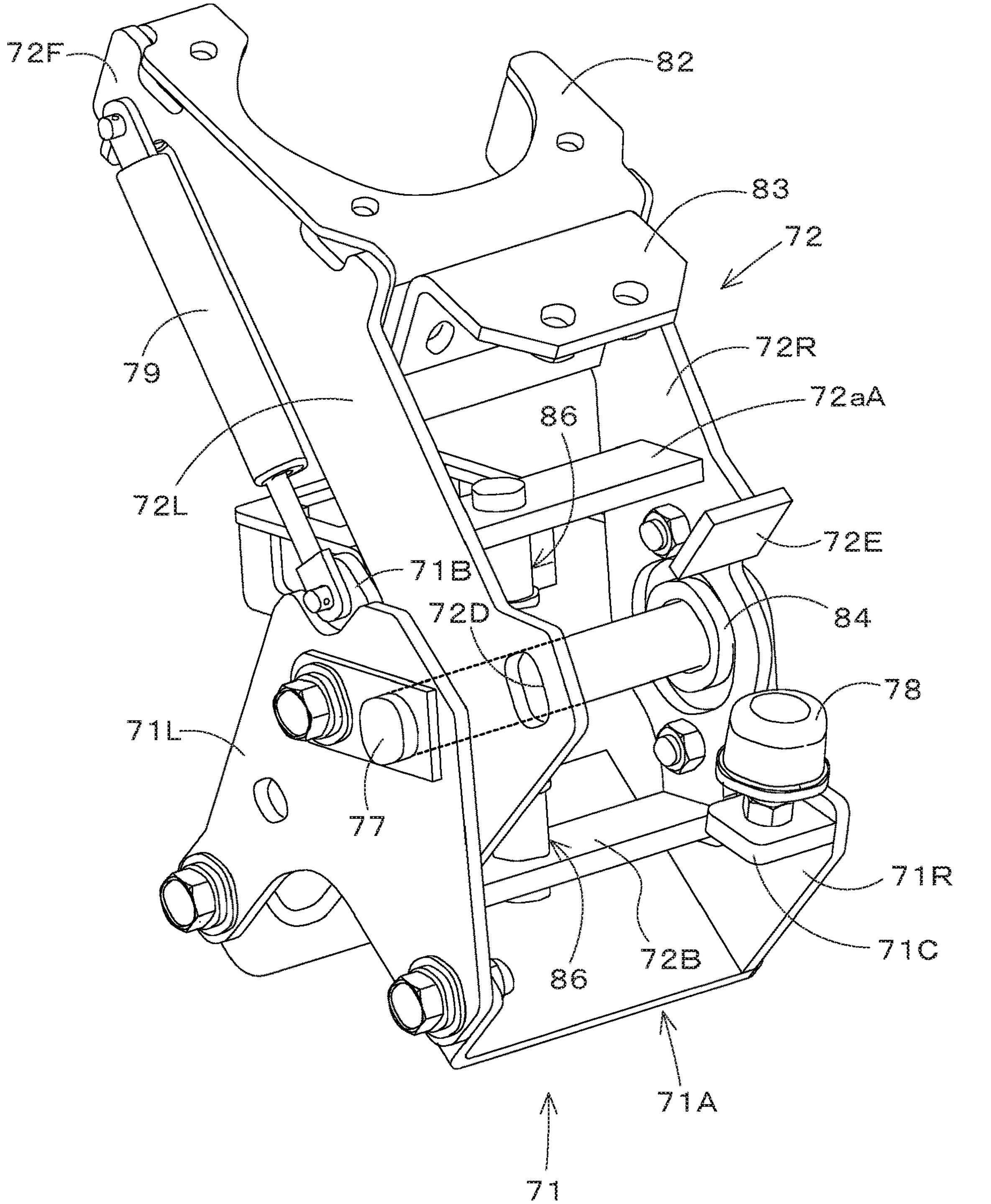
FIG. 6 is a left rear perspective view showing the relationship between a base and a movable bracket.
Figure 7:
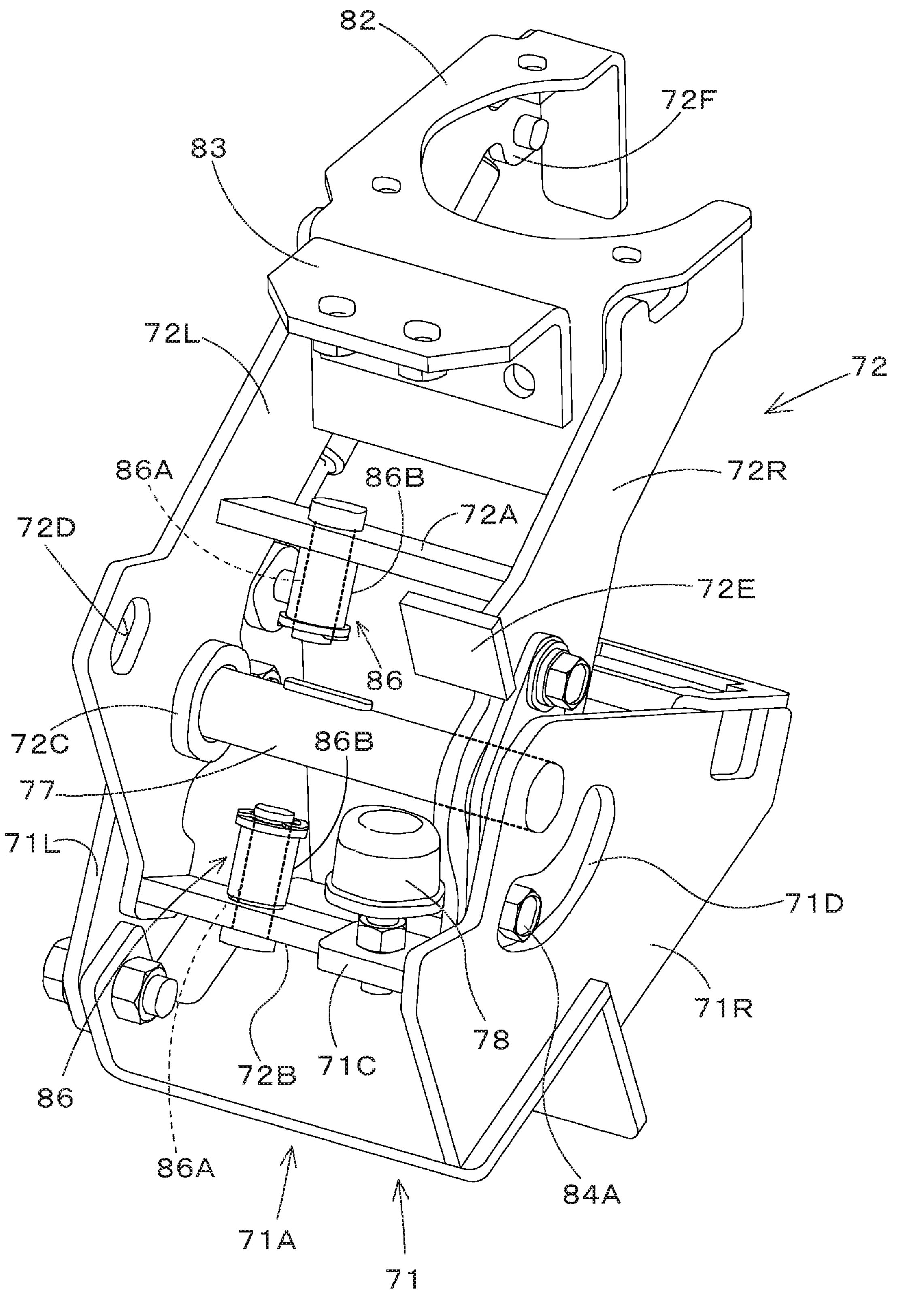
FIG. 7 is a right rear perspective view showing the relationship between the base and the movable bracket.

As illustrated in FIGS. 6 and 7, the base 71 is made of plate(s) and includes a first side wall 71L which is a left side wall, a second side wall 71R which is a right side wall, and a connecting plate 71A that connects the first side wall 71L and the second side wall 71R at their lower portion. The connecting plate 71A is attached to the member 90 fixed to the machine body 2. The support shaft 77 is provided to span the gap between the first and second side walls 71L and 71R. The support shaft 77 is supported by the first and second side walls 71L and 71R and is attached to the first side wall 71L to be secured to the base 71. A first pivot portion 71B is provided at an upper portion of the first side wall 71L. A mounting stay 71C is fixed to the inner side of the second side wall 71R (fixed to the surface facing the first side wall 71L), and a position restrictor 78 is attached to the mounting stay 71C. The second side wall 71R has, at a position below the support shaft 77, an insertion slot 71D in the form of an arc centered on the axis of the support shaft 77.

As illustrated in FIG. 4A, the movable bracket 72 is supported directly or indirectly on the base 71 such that movable bracket 72 projects forward from the upper portion of the base 71 when the unloading lever 73 and the movable bracket 72 are in the lowered position P1. The movable bracket 72 is provided, at a front portion thereof, with a valve mount 82 where the remote control valve 68 is mounted and a mounting stay 83 where the armrest 69L is attached.

As illustrated in FIGS. 6 and 7, the movable bracket 72 is made of plate(s) and includes a first wall portion 72L which is a left side wall, a second wall portion 72R which is a right side wall, and a pair of connecting stays 72A and 72B that connect the first wall portion 72L and second wall portion 72R. A rear portion of the first wall portion 72L is located inward of an upper portion of the first side wall 71L, and a rear portion of the second wall portion 72R is located inward of the second side wall 71R. The support shaft 77 is inserted to span the gap between the first and second wall portions 72L and 72R. The first wall portion 72L is supported on the support shaft 77 such that the first wall portion 72L is pivotable about an axis, via a boss 72C which passes through the first wall portion 72L and is fixed to the first wall portion 72L by welding or other method. A bearing member 84 is attached to the outside of the second wall portion 72R (opposite the surface facing the first wall portion 72L). The second wall portion 72R is supported on the support shaft 77 via the bearing member 84 such that the second wall portion 72R is pivotable about an axis. The head of one (bolt 84A) of two bolts which attach the bearing member 84 is inserted in the insertion slot 71D and movable within the insertion slot 71D as the movable bracket 72 pivots about the support shaft 77.

Figure 11:
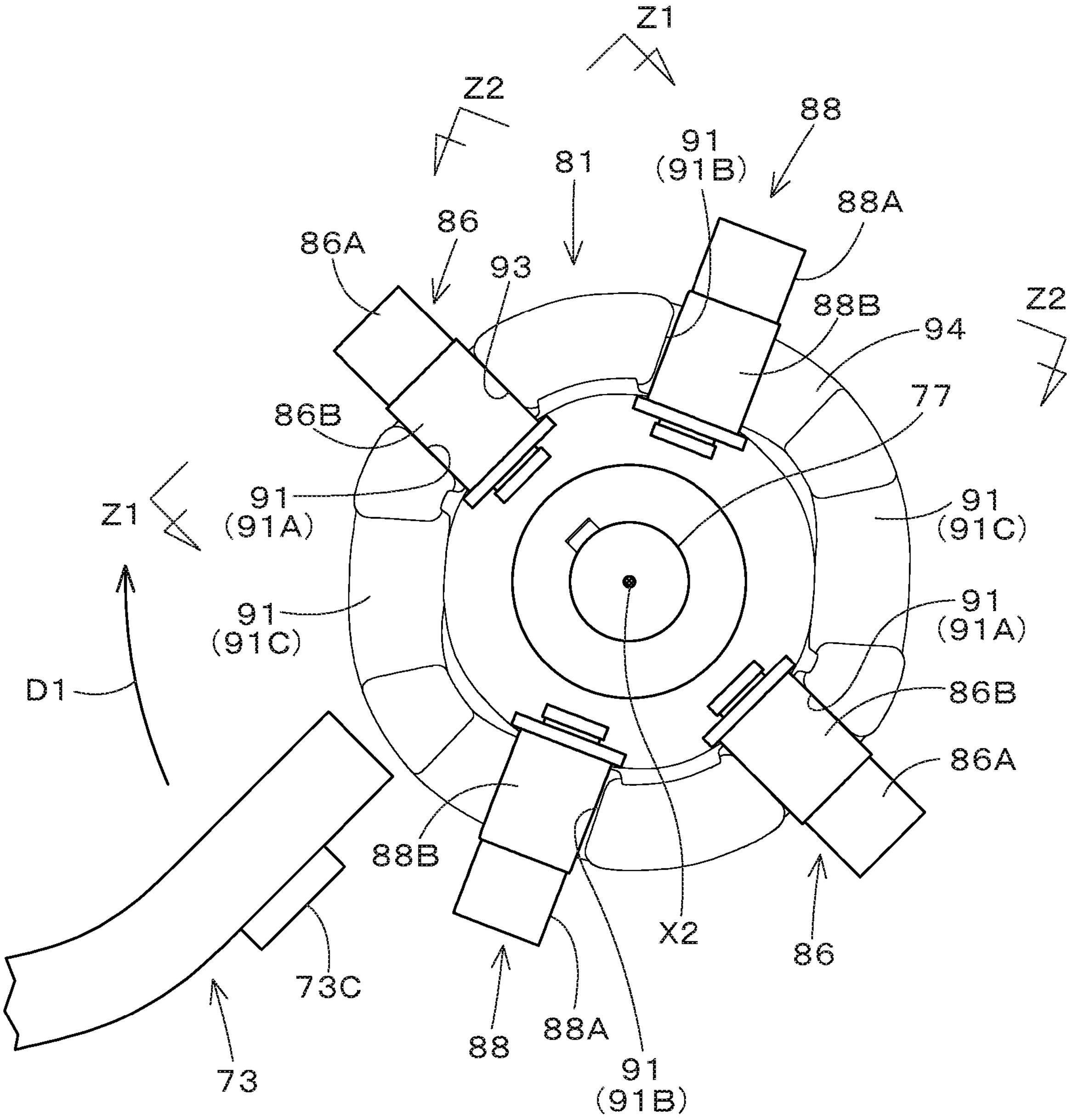
FIG. 11 is a side view of the cam member, first engagement portions, and second engagement portions when the movable bracket and the lever are in the lowered position.

As illustrated in FIG. 7, the pair of connecting stays 72A and 72B are located at a rear portion of the movable bracket 72 such that the support shaft 77 is located between the connecting stays 72A and 72B and the connecting stays 72A and 72B extend to span the gap between the first wall portion 72L and the second wall portion 72R. Each of the connecting stays 72A and 72B is provided with a first engagement portion 86. That is, in the present embodiment, a pair of the first engagement portions 86 are provided. Note that only a single first engagement portion 86 may be provided. In other words, it is only necessary to provide at least one first engagement portion 86. The pair of first engagement portions 86 are arranged symmetrically to each other with respect to the center (axis X2) of the support shaft 77, as illustrated in FIG. 11. Each first engagement portion 86 includes a shaft portion 86A fixed to the connecting stay 72A or 72B, and a roller 86B fitted on the outside of the shaft portion 86A such that the roller 83B is rotatable about the axis of the shaft portion 86A. The shaft portion 86A is fixed to the connecting stay 72A or 72B such that the shaft portion 86A projects from the connecting stay 72A or 72B toward the support shaft 77. The roller 86B is cylindrical in shape and is fitted to the shaft portion 86A between the connecting stay 72A or 72B and the support shaft 77.

As illustrated in FIGS. 6 and 7, a guide slot 72D in the form of an arc centered on the axis of the support shaft 77 is provided at an upper rear portion of the first wall portion 72L. A contact member 72E is fixed to a rear portion of the second wall portion 72R. When the movable bracket 72 is pivoted to the raised position P2, the contact member 72E contacts the position restrictor 78 on the base 71 to restrict the movable bracket 72 from pivoting in the upward direction D1. As illustrated in FIG. 6, a second pivot portion 72F is provided at a front portion of the first wall portion 72L.

Figure 8:
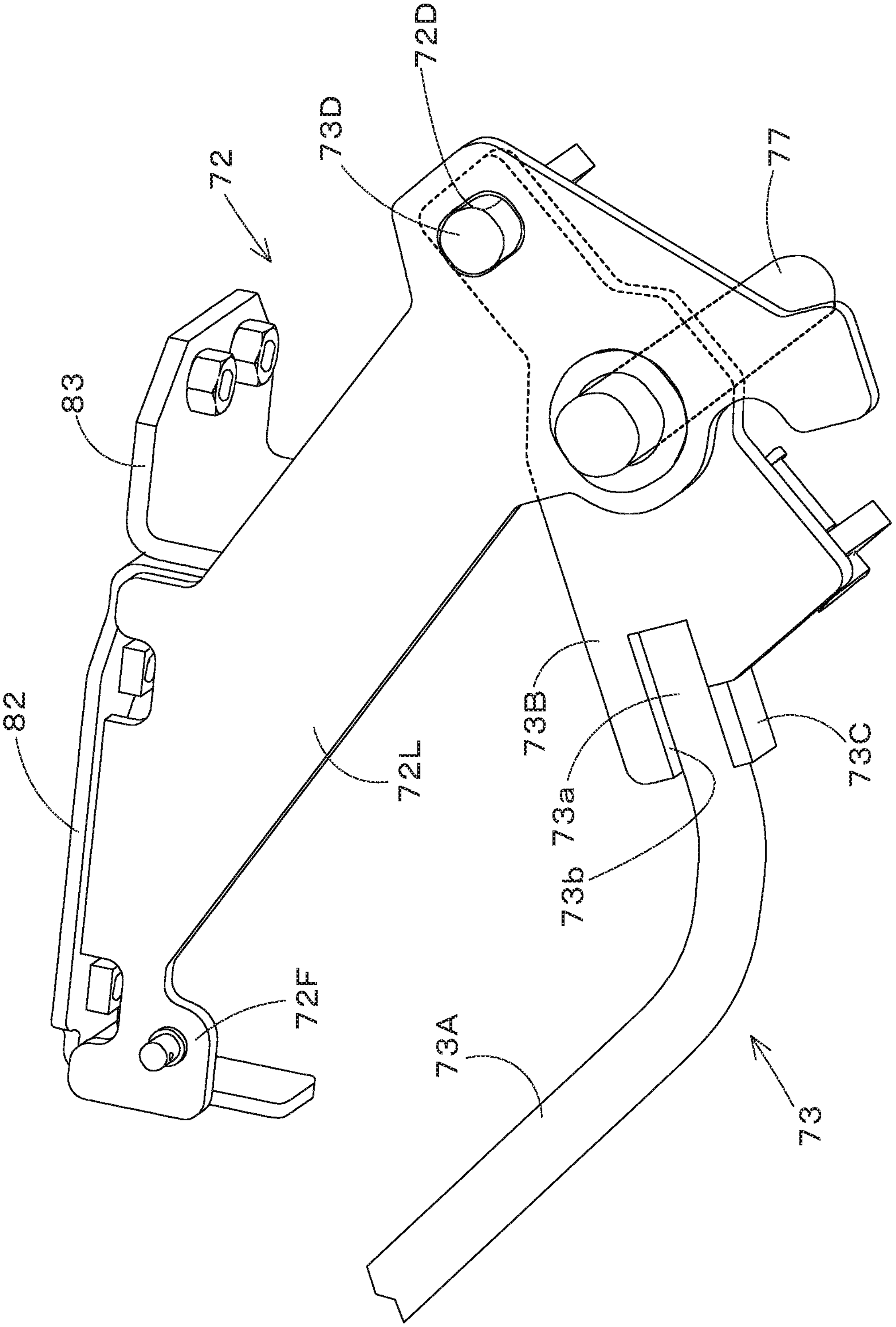
FIG. 8 is a left side perspective view showing the relationship between the movable bracket and a lever.
Figure 9:
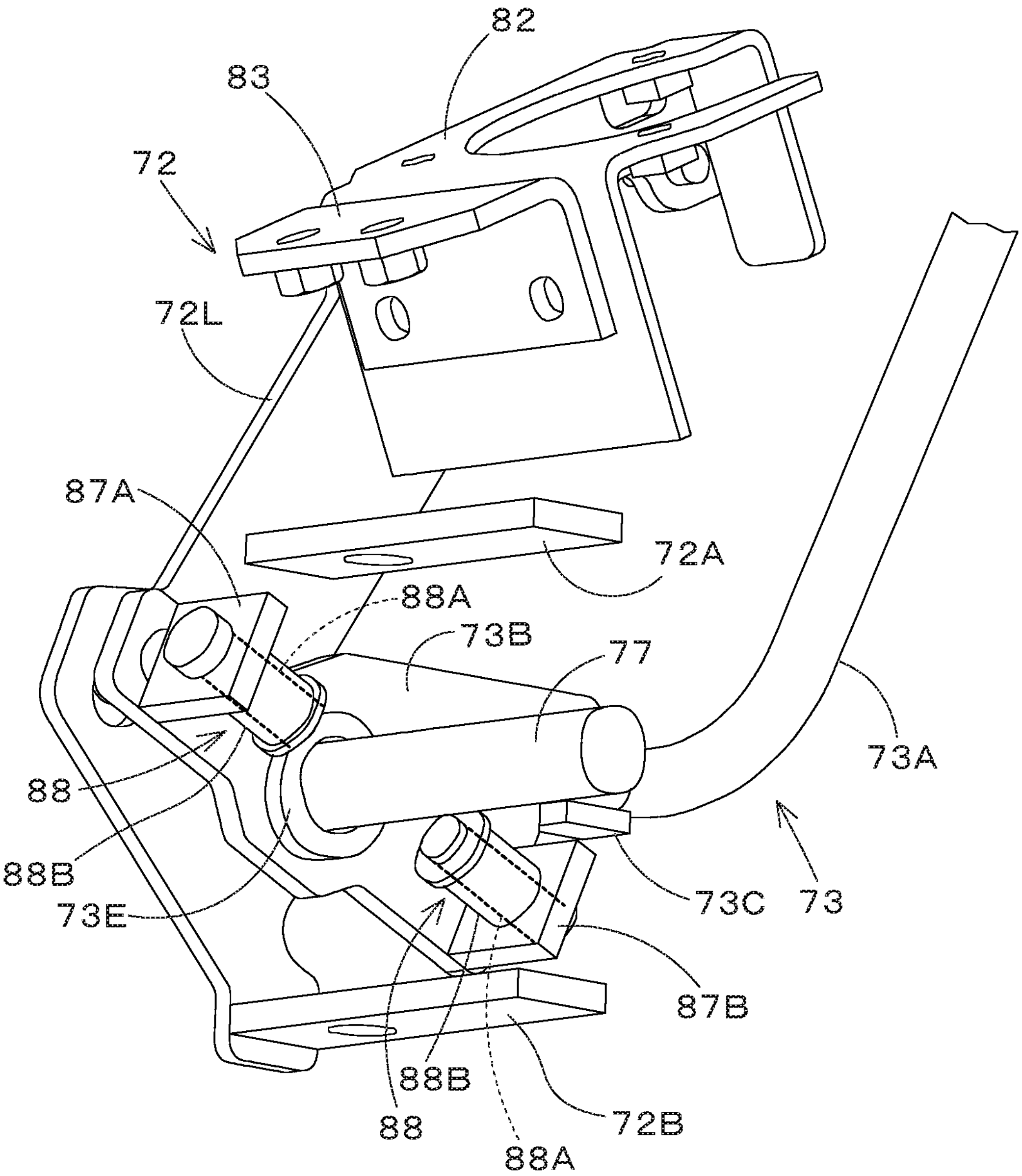
FIG. 9 is a right side perspective view showing the relationship between the movable bracket and the lever.

As illustrated in FIGS. 8 and 9, the unloading lever 73 includes a lever body 73A, a lever base 73B, a contact stay 73C, and a pin 73D. A base 73*a* of the lever body 73A is inserted into a cutout 73*b* in the lever base 73B and secured to that lever base 73B by welding or some other method. The contact stay 73C is fixed directly or indirectly to the lower surface of the base 73*a* of the lever body 73A. The lever base 73B is located inward of the first wall portion 72L of the movable bracket 72. The lever base 73B is supported on the support shaft 77 via a boss portion 73E that passes through and is fixed to the lever base 73B by welding or some other method such that the lever base 73B is rotatable about the axis (see FIG. 10).

As illustrated in FIG. 9, a pair of support stays 87A and 87B are fixed to the opposite surface of the lever base 73B from the first wall portion 72L. The pair of support stays 87A and 87B are provided such that the support shaft 77 is located between them. Each of the support stays 87A and 87B is provided with a second engagement portion 88. That is, in the present embodiment, a pair of the second engagement portions 88 are provided. Note that only a single second engagement portion 88 may be provided. In other words, it is only necessary to provide at least one second engagement portion 88. The pair of second engagement portions 88 are arranged symmetrically to each other with respect to the center (axis) of the support shaft 77, as illustrated in FIG. 11. Each second engagement portion 88 includes a shaft portion 88A fixed to the support stay 87A or 87B, and a roller 88B freely fitted on the outside of the shaft portion 88A such that the roller 88B is rotatable about the axis of the shaft portion 88A. The shaft portion 88A is fixed to the support stay 87A or 87B such that the shaft portion 88A projects from the support stay 87A or 87B toward the support shaft 77. The roller 88B is cylindrical in shape and is fitted on the shaft portion 88A between the support stay 87A or 87B and the support shaft 77. The pair of first engagement portions 86 (rollers 86B) and the pair of second engagement portions 88 (rollers 88B) are located on the same circumference centered on the axis X2 of the support shaft 77 (see FIG. 11).

Figure 4B:
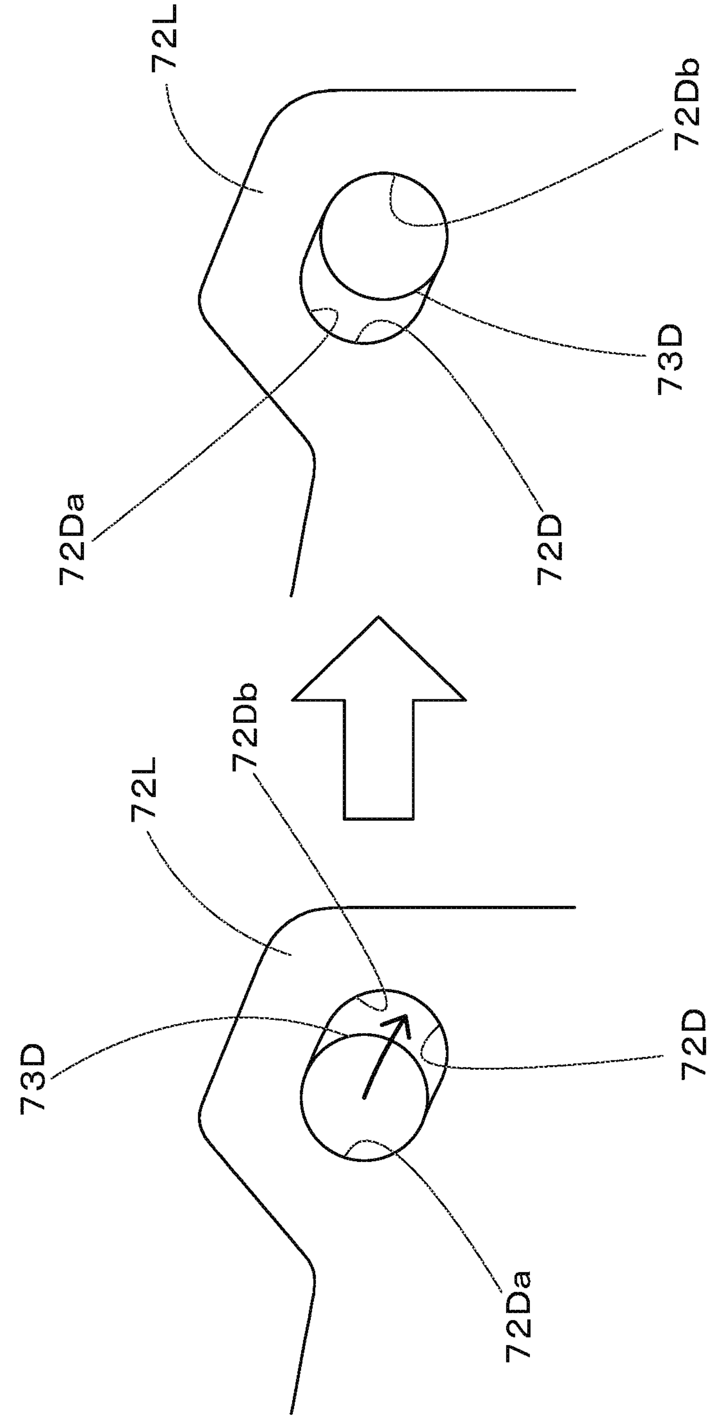
FIG. 4B shows side views illustrating the movement of a pin during transition from the lowered position to a raised position.

As illustrated in FIGS. 4B and 8, the pin 73D is inserted through the guide slot 72D in the first wall portion 72L. The pin 73D can move between a first end 72Da and a second end 72Db of the guide slot 72D as the unloading lever 73 pivots about the support shaft 77.

Note that the pin 73D may be provided on the first wall portion 72L and the guide slot 72D may be provided directly or indirectly in/on the unloading lever 73.

As illustrated in FIGS. 4A and 6, the biasing member 79 includes a gas spring. The biasing member 79 is pivoted at a first end on the first pivot portion 71B and at a second end on the second pivot portion 72F. Thus, the biasing member 79 biases the movable bracket 72 in the upward direction D1.

The detection switch 80 is a sensor to detect whether the unloading lever 73 (and the movable bracket 72) is in the lowered position P1 or in a position above the lowered position P1. As illustrated in FIG. 3A, the detection switch 80 is located at a front portion of the base 71 near the first side wall 71L, and is attached to the base 71. When the unloading lever 73 (and the movable bracket 72) is in the lowered position P1, the contact stay 73C on the unloading lever 73 presses a contact of the detection switch 80, so that the unloading lever 73 is detected as being in the lowered position P1. When the unloading lever 73 is pivoted from the lowered position P1 in the upward direction D1 and the pressure on the contact applied by the contact stay 73C is removed, the unloading lever 73 is detected as having been pivoted upward from the lowered position P1.

Figure 10:
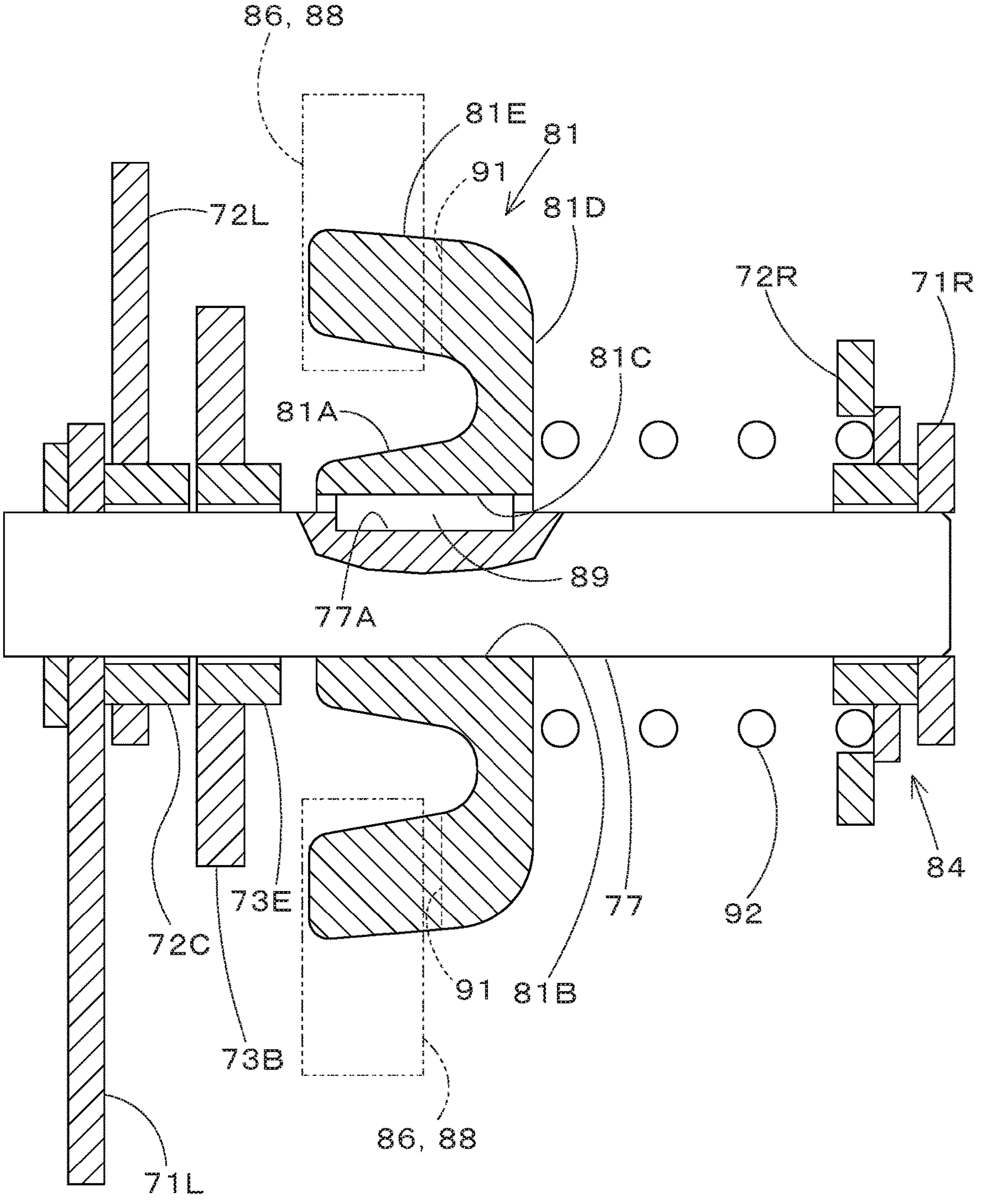
FIG. 10 is a rear cross-sectional view of a cam member and its surroundings.

As illustrated in FIG. 10, the cam member 81 is attached to the support shaft 77 between the lever base 73B and the second wall portion 72R such that the cam member 81 is not rotatable about the axis but movable in the axial direction. Specifically, a central wall 81A at a central portion of the cam member 81 has an insertion hole 81B through which the support shaft 77 is inserted in the axial direction (machine body width direction). There is an insertion slot 81C in the inner peripheral surface of the insertion hole 81B over the axial direction of the cam member 81. A key 89 that fits into a keyway 77A in the support shaft 77 is inserted in the insertion slot 81C. This allows the cam member 81 to be not rotatable about the axis of the support shaft 77 and movable in the axial direction of the support shaft 77. Note that key connection does not need to be used to allow the cam member 81 to be not rotatable about the axis of the support shaft 77 and movable in the axial direction of the support shaft 77. For example, elements may be arranged such that a slide plate projects from the end face (right end face) 81D facing the second wall portion 72R of the cam member 81 along the support shaft 77 and a slide plate projects also from the second wall portion 72R along the support shaft 77, the plate surfaces of these slide plates are slidably brought into contact with each other, so that the cam member 81 is not rotatable about the axis of the support shaft 77 and movable in the axial direction of the support shaft 77. Elements may be arranged such that the support shaft 77 and the central wall 81A of the cam member 81 are splined, so that the cam member 81 is not rotatable about the axis of the support shaft 77 and movable in the axial direction of the support shaft 77.

The cam member 81 is an end cam which includes a cylinder having recesses at an outer peripheral portion of an end face thereof. The recesses (engagement recesses 91) in the cam member 81, i.e., a plurality of engagement recess 91, are in the surface facing the lever base 73B (left surface) of an outer wall 81E of the cam member 81. The engagement recesses 91 receive the first engagement portions 86 and the second engagement portions 88 (have the first engagement portions 86 and the second engagement portions 88 fitted therein (engaged therewith)).

Figure 12:
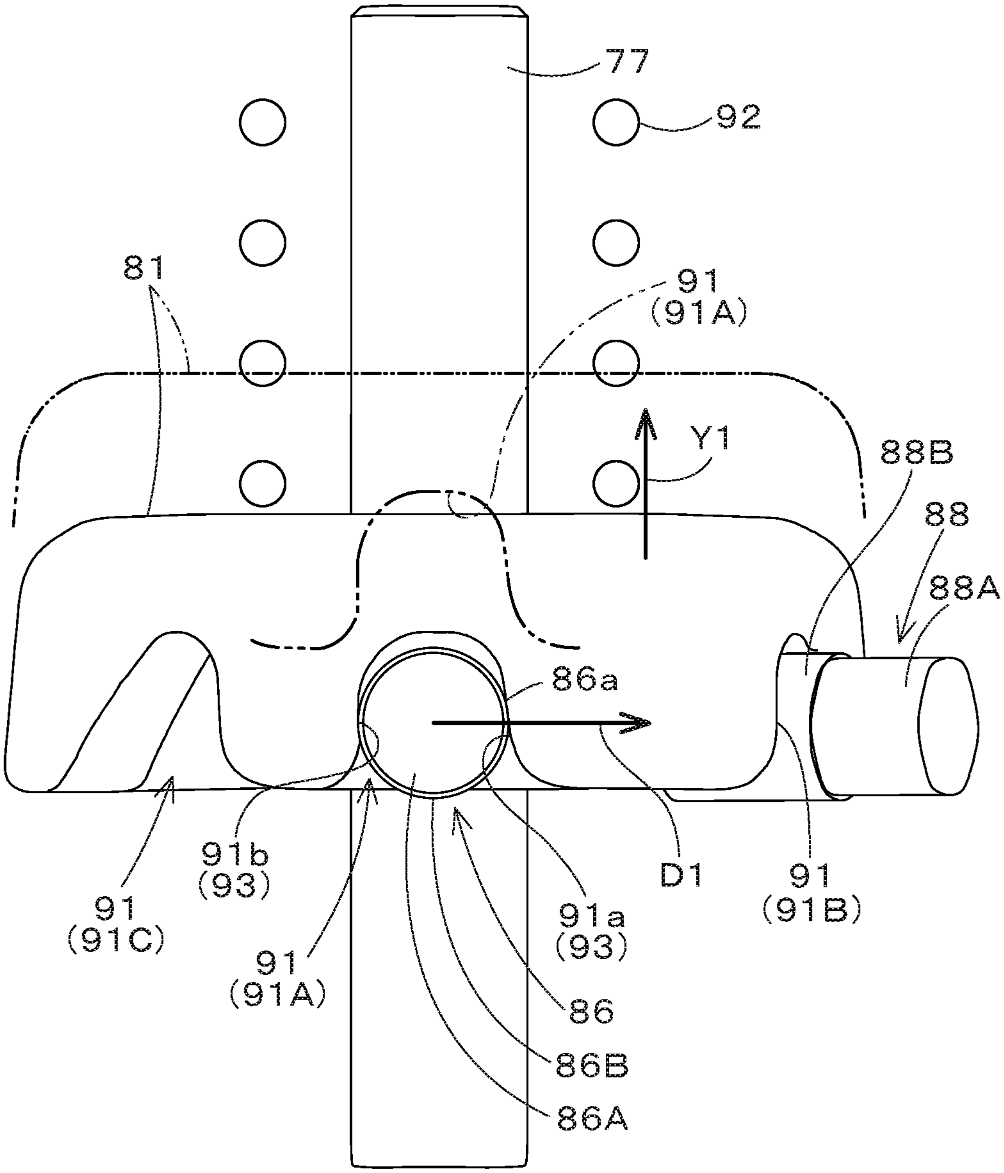
FIG. 12 shows a view on arrow Z1, Z1 of FIG. 11.

FIG. 11 illustrates the surface of the cam member 81 engaged with the first engagement portions 86 and the second engagement portions 88 when the unloading lever 73 and the movable bracket 72 are in the lowered position P1. FIG. 12 illustrates the surface of the cam member 81 engaged with the first engagement portions 86 and the second engagement portions 88 when the unloading lever 73 and the movable bracket 72 in the raised position P2. As illustrated in FIGS. 11 and 12, the first engagement portions 86 (rollers) and the second engagement portions 88 (rollers) are fitted in the engagement recesses 91. In other words, the cam member 81 includes the engagement recesses 91 to receive the first engagement portions 86 and the second engagement portions 88 when the unloading lever 73 and the movable bracket 72 are in the lowered position P1 and when the unloading lever 73 and the movable bracket 72 are in the raised position P2.

As illustrated in FIG. 11, the engagement recesses 91 include first engagement recess(es) 91A, second engagement recess(es) 91B, and third engagement recess(es) 91C. A pair of the first engagement recesses 91A, a pair of the second engagement recesses 91B, and a pair of the third engagement recesses 91C are provided such that each pair corresponds to a pair of the first engagement portions 86 or a pair of the second engagement portions 88. Thus, if only a single first engagement portion 86 and a single second engagement portion 88 are provided, then a single first engagement recess 91A, a single second engagement recess 91B, and a single third engagement recess 91C are provided.

As illustrated in FIG. 11, when the unloading lever 73 and the movable bracket 72 are in the lowered position P1, the first engagement recesses 91A receive the first engagement portions 86 (rollers 86B), the second engagement recesses

Figure 14:
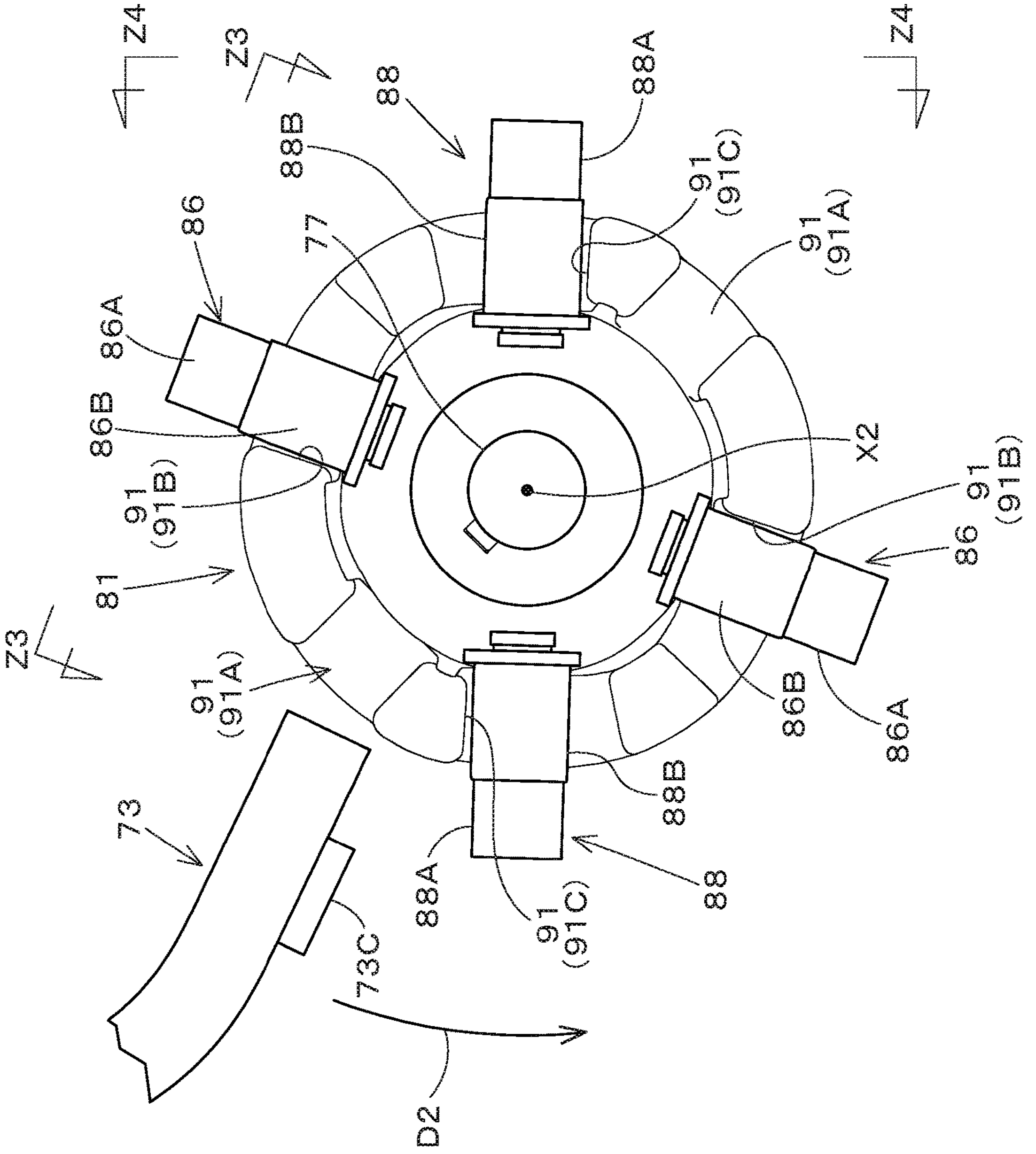
FIG. 14 is a side view of the cam member, the first engagement portions, and the second engagement portions when the movable bracket and the lever are in the raised position.

91B receive the second engagement portions 88 (rollers 88B), and the third engagement recesses 91C do not receive the first engagement portions 86 (rollers 86B) or the second engagement portions 88 (rollers 88B). As illustrated in FIG. 14, when the unloading lever 73 and the movable bracket 72 are in the raised position P2, the first engagement recesses 91A do not receive the first engagement portions 86 (rollers 86B) or the second engagement portions 88 (rollers 88B), the second engagement recesses 91B receive the first engagement portions 86 (rollers 86B), and the third engagement recesses 91C receive the second engagement portions 88 (rollers 88B). Thus, the second engagement recesses 91B are used both as engagement recesses to receive the first engagement portions 86 and engagement recesses to receive the second engagement portions 88. Since some engagement recesses also function as different engagement portions, the cam member 81 (unloading lever device 70) can be made smaller and simpler. Note that this does not imply any limitation, and engagement recesses to receive the first engagement portions 86 when the unloading lever 73 and the movable bracket 72 are in the raised position P2 may be provided separately from the second engagement recesses 91B. In other words, two engagement recesses may be provided for one first engagement portion 86, and two engagement recesses may be provided for one second engagement portion 88. That is, in the present embodiment, three engagement recesses are provided for one first engagement portion 86 and one second engagement portion 88, but four engagement recesses may be provided for one first engagement portion 86 and one second engagement portion 88.

As illustrated in FIG. 10, a biasing member 92 is provided between the cam member 81 and the second wall portion 72R. The biasing member 92 biases the cam member 81 in the direction that allows the cam member 81 to engage with the first engagement portions 86 and the second engagement portions 88. Specifically, the biasing member 92 includes a coil spring and is positioned to be wound around the outer circumference of the support shaft 77. In the present embodiment, the biasing member 92 (coil spring) is placed in a compressed manner between the end face 81D of the cam member 81 and the bearing member 84, a first end of the biasing member 92 is in contact with the end face 81D of the cam member 81, and a second end of the biasing member 92 is in contact with the bearing member 84. Note that the second end of the biasing member 92 may be in contact with the second wall portion 72R.

As illustrated in FIG. 12, when the unloading lever 73 and the movable bracket 72 are in the lowered position P1, the engagement surface (first engagement surface 91*a*) of each engagement recess 91A that engages with (contacts) a portion 86*a* at an end of a corresponding first engagement portion 86 (i.e., the portion that faces in the upward direction D1) functions as a pivot restrictor surface 93 which does not allow the movable bracket 72 to pivot even when the movable bracket 72 is about to be forcibly pivoted in the upward direction D1 (which does not allow the first engagement portion 86 to leave the first engagement recess 91A). That is, the pivot restrictor surface 93 is a surface that restricts the movable bracket 72 from pivoting. In other words, the first engagement portion 86 restricts the movable bracket 72 from pivoting in the upward direction D1 by engaging with the cam member 81 (first engagement recess 91A) when the unloading lever 73 and the movable bracket 72 are in the lowered position P1. The pivot restrictor surface 93 is a surface orthogonal to the circumferential direction of the cam member 81 or a sloping surface sloping toward the opening of the recess in the upward direction D1, and is inclined at an angle that can prevent the movable bracket 72 (first engagement portion 86) from pivoting. Note that the engagement surface (second engagement surface 91*b*) on the opposite side of the first engagement recess 91A from the first engagement surface 91*a* (opposite side in the circumferential direction of the cam member 81) also functions as a pivot restrictor surface 93.

Figure 13:
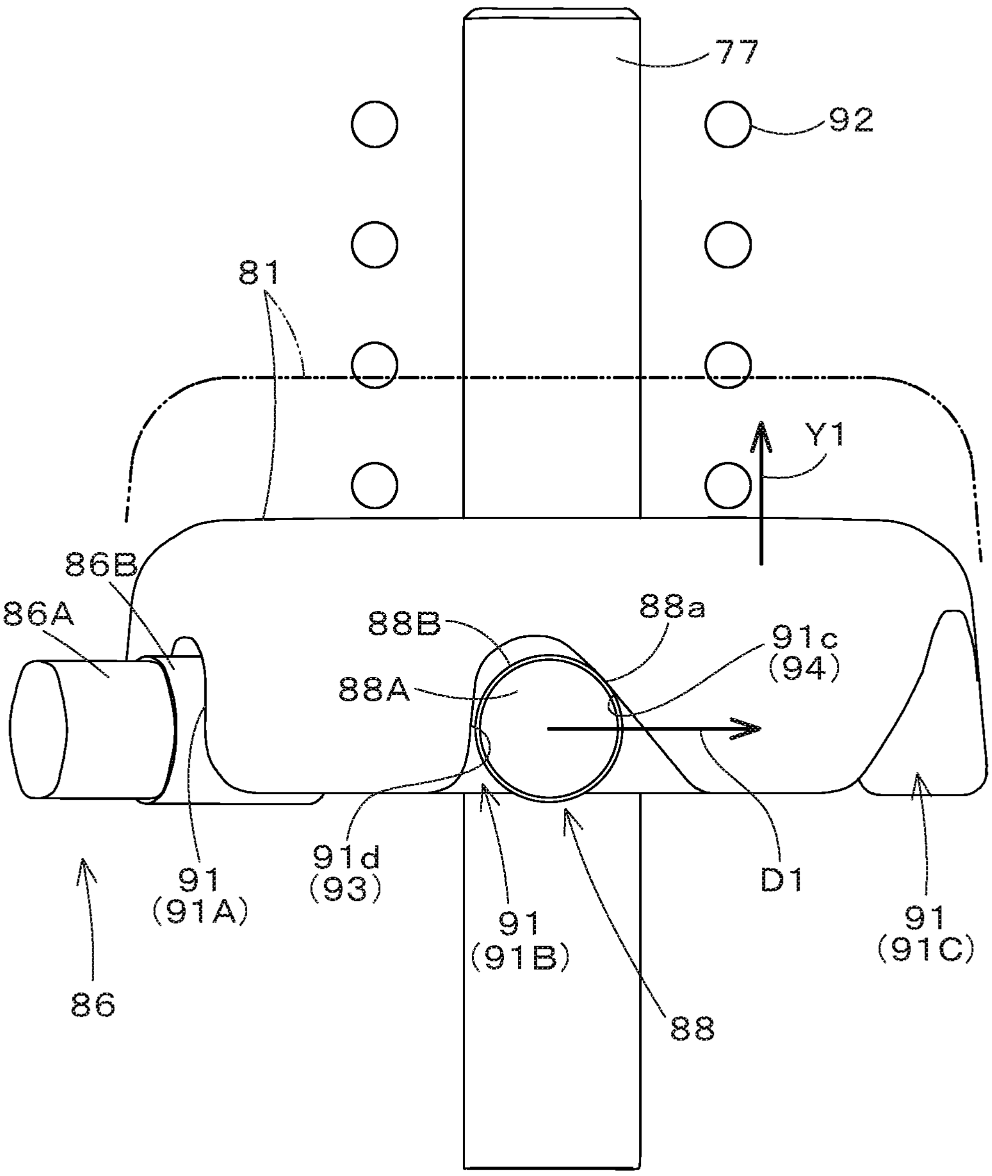
FIG. 13 shows a view on arrow Z2, Z2 of FIG. 11.

As illustrated in FIG. 13, when the unloading lever 73 and the movable bracket 72 are in the lowered position P1, the engagement surface (third engagement surface 91*c*) of each second engagement recess 91B that engages with (contacts) a portion 88*a* at an end of a corresponding second engagement portion 88 (i.e., the portion that faces in the upward direction D1) functions as a cam surface 94 which allows, when the unloading lever 73 is pivoted in the upward direction D1, the second engagement portion 88 to slide to cause the cam member 81 to move against the biasing force of the biasing member 92. The cam surface 94 is a sloping surface sloping toward the opening of the recess in the upward direction D1, and is a gently sloping surface that allows the cam member 81 to move against the biasing force of the biasing member 92 when the unloading lever 73 is pivoted to push the second engagement portion 88 against the sloping surface. In the present embodiment, the angle of inclination of the cam surface 94 is, for example, but not limited to, about 45°. The engagement surface (fourth engagement surface 91*d*) of the second engagement recess 91B on the opposite side from the third engagement surface 91*c* (opposite side in the circumferential direction of the cam member 81) functions as a pivot restrictor surface 93.

That is, the engagement recess 91 that receives the first engagement portion 86 has the pivot restrictor surface 93 which restricts the movable bracket 72 from pivoting by contacting the first engagement portion 86. The engagement recess 91 that receives the second engagement portion 88 has the cam surface 94 on which the second engagement portion 88 slides such that the cam member 81 moves against the biasing force of the biasing member 92 when the second engagement portion 88 pivots together with the unloading lever 73.

The unloading lever device 70 according to the present embodiment is such that, when the movable bracket 72 and the unloading lever 73 are in the lowered position P1, as illustrated in FIG. 12, each first engagement portion 86 engages with a corresponding second engagement surface 91*b* (pivot restrictor surface 93) to restrict the movable bracket 72 from pivoting downward, and, as illustrated in FIG. 13, each second engagement portion 88 engages with a corresponding fourth engagement surface 91*d* (pivot restrictor surface 93) to restrict the unloading lever 73 from pivoting downward. This restricts the movable bracket 72 and the unloading lever 73 from pivoting downward from the lowered position P1.

When the unloading lever 73 is pivoted in the upward direction D1 from the lowered position P1 illustrated in FIG. 4A, the second engagement portion 88 slides on the third engagement surface 91*c* (cam surface 94) of the second engagement recess 91B in the upward direction D1, moving the cam member 81 in the direction of arrow Y1 (see dot-dot-dash line in FIG. 13) as illustrated in FIG. 13. On the contrary, as illustrated in FIG. 12, when the unloading lever 73 and the movable bracket 72 are in the lowered position P1, each first engagement portion 86 engages with (contacts) a corresponding pivot restrictor surface 93 (first engagement surface 91*a*) of a corresponding first engagement recess 91A and the movable bracket 72 does not pivot, so that the unloading lever 73 pivots relative to the movable bracket 72 when pivoting upward from the lowered position P1. Specifically, when the unloading lever 73 is in the lowered position P1, the pin 73D is at the first end 72Da of the guide slot 72D, as illustrated in the left portion of FIG. 4B, and as the unloading lever 73 pivots upward from the lowered position P1, the pin 73D moves to the second end 72Db of the guide slot 72D, as illustrated in the right portion of FIG. 4B. This allows the unloading lever 73 to pivot relative to the movable bracket 72.

When each second engagement portion 88 disengages from a corresponding second engagement recess 91B and moves onto the left end face of the cam member 81, each first engagement recess 91A disengages from a corresponding first engagement portion 86, resulting in disengagement between the first engagement portions 86 and the first engagement recesses 91A, as shown by the dot-dot-dash line in FIG. 12. Upon disengagement between the first engagement portions 86 and the first engagement recesses 91A, the movable bracket 72 is allowed to pivot in the upward direction D1. With the first engagement portions 86 disengaged from the first engagement recesses 91A, the pin 73D is located at the second end 72Db of the guide slot 72D.

That is, the unloading lever 73 pivots relative to the movable bracket 72 while the first engagement portions 86 and the cam member 81 (first engagement recess 91A) are about to be disengaged, and pivots together with the movable bracket 72 after the first engagement portions 86 and the cam member 81 are disengaged.

When the unloading lever 73 is pivoted from the lowered position P1 in the upward direction D1 to pivot the movable bracket 72 to the raised position P2, the movable bracket 72 may be pivoted by the unloading lever 73, but in the present embodiment, when the movable bracket 72 is pivoted from the lowered position P1 to the raised position P2, the movable bracket 72 is pivoted by the biasing force of the gas spring 79 in the upward direction D1.

When the unloading lever 73 and the movable bracket 72 are pivoted to the raised position P2, each first engagement portion 86 fits into a corresponding second engagement recess 91B and each second engagement portion 88 fits into a corresponding third engagement recess 91C, as illustrated in FIG. 14. When the unloading lever 73 and the movable bracket 72 are in the raised position P2, the movable bracket 72 is restricted from pivoting in the upward direction D1 by the contact member 72E contacting the position restrictor 78, and the unloading lever 73 is restricted from pivoting in the upward direction D1 because the pin 73D is at the second end 72Db of the guide slot 72D.

Figure 15:
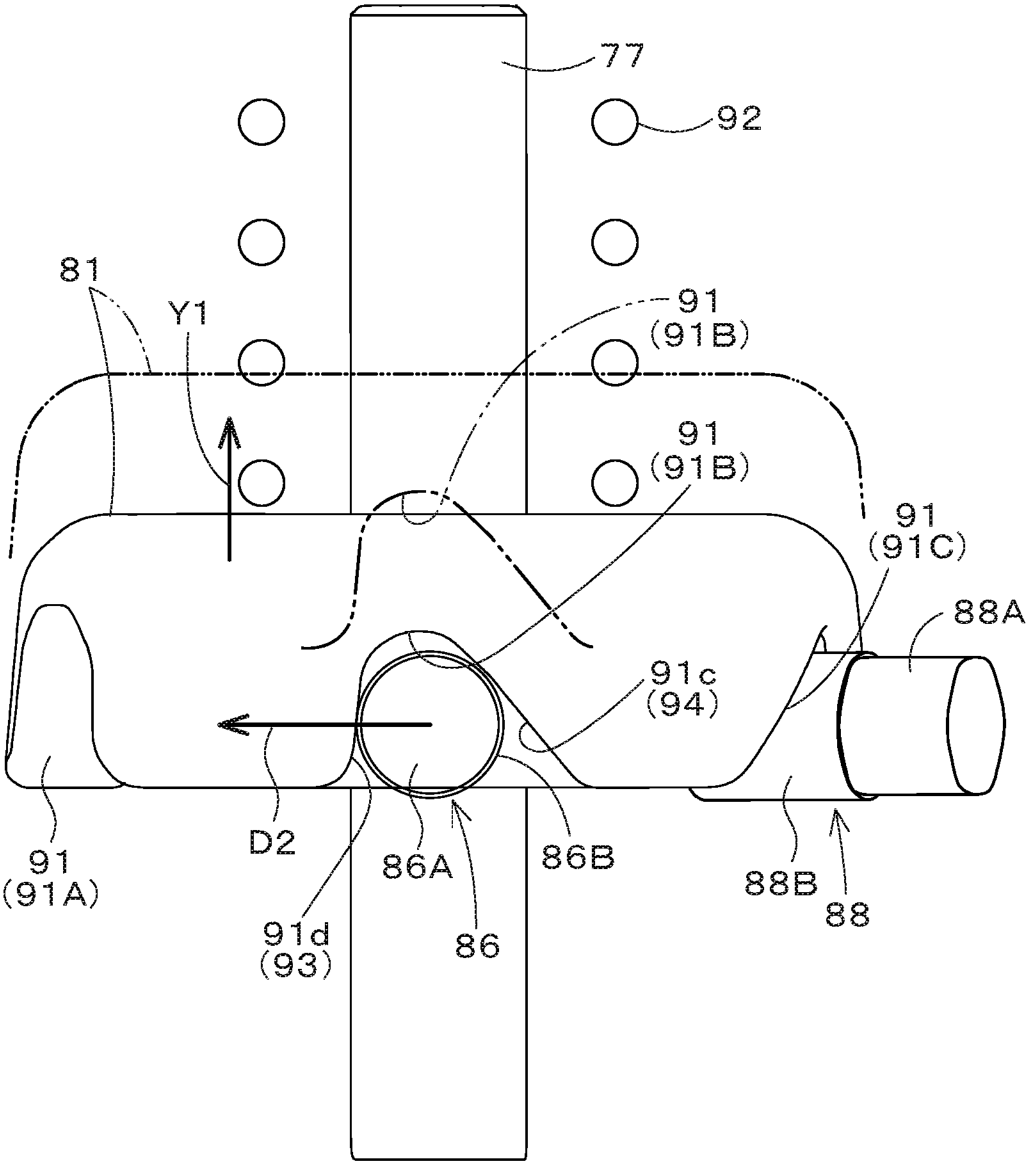
FIG. 15 shows a view on arrow Z3, Z3 of FIG. 14.

As illustrated in FIG. 15, when the unloading lever 73 and the movable bracket 72 are in the raised position P2, each first engagement portion 86 engages with (contacts) a corresponding fourth engagement surface 91*d* (pivot restrictor surface 93), so that the movable bracket 72 does not pivot in the downward direction D2 even when the movable bracket 72 is about to be pivoted in the downward direction D2.

Figure 16:
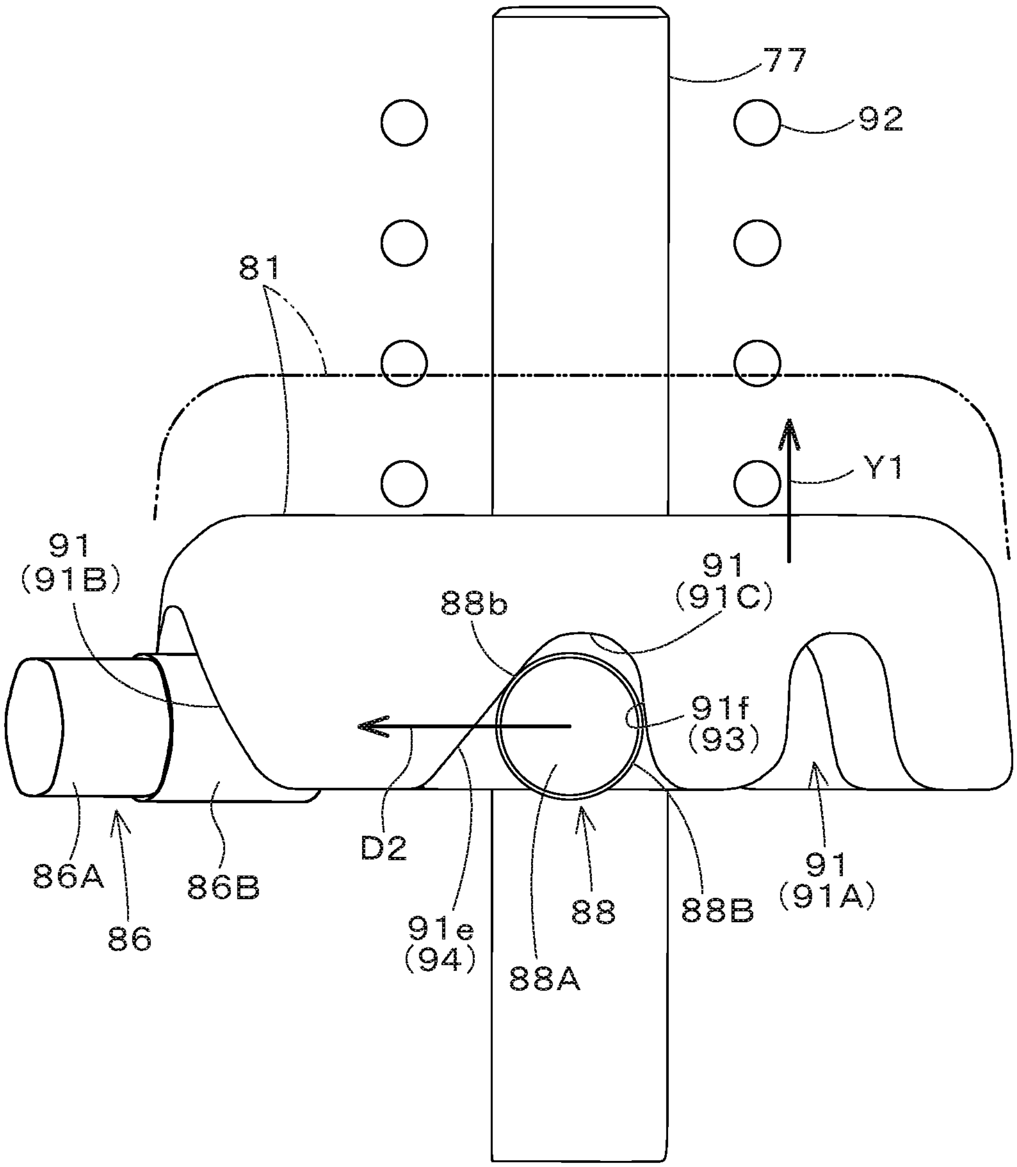
FIG. 16 shows a view on arrow Z4, Z4 of FIG. 14.

As illustrated in FIG. 16, the engagement surface (fifth engagement surface 91*e*) of each third engagement recess 91C that engages with (contacts) a portion 88*b* at an end of a corresponding second engagement portion 88 (i.e., the portion that faces in the downward direction D2) functions as a cam surface 94. The cam surface 94 of the third engagement recess 91C is a sloping surface sloping toward the opening of the recess in the downward direction D2, and is a gentle sloping surface that allows the cam member 81 to move against the biasing force of the biasing member 92 by forcing the unloading lever 73 to pivot and pressing the second engagement portion 88 against the surface. The engagement surface (sixth engagement surface 91*f*) on the opposite side of the third engagement recess 91C from the fifth engagement surface 91*e* (opposite side in the circumferential direction of the cam member 81) functions as a pivot restrictor surface 93.

When the unloading lever 73 is pivoted from the raised position P2 in the downward direction D2, as illustrated in FIG. 16, the second engagement portion 88 slides on the fifth engagement surface 91*e* (cam surface 94) of the third engagement recess 91C in the downward direction D2, moving the cam member 81 in the direction of arrow Y1 (see dot-dot-dash line in FIG. 16).

Figure 5B:
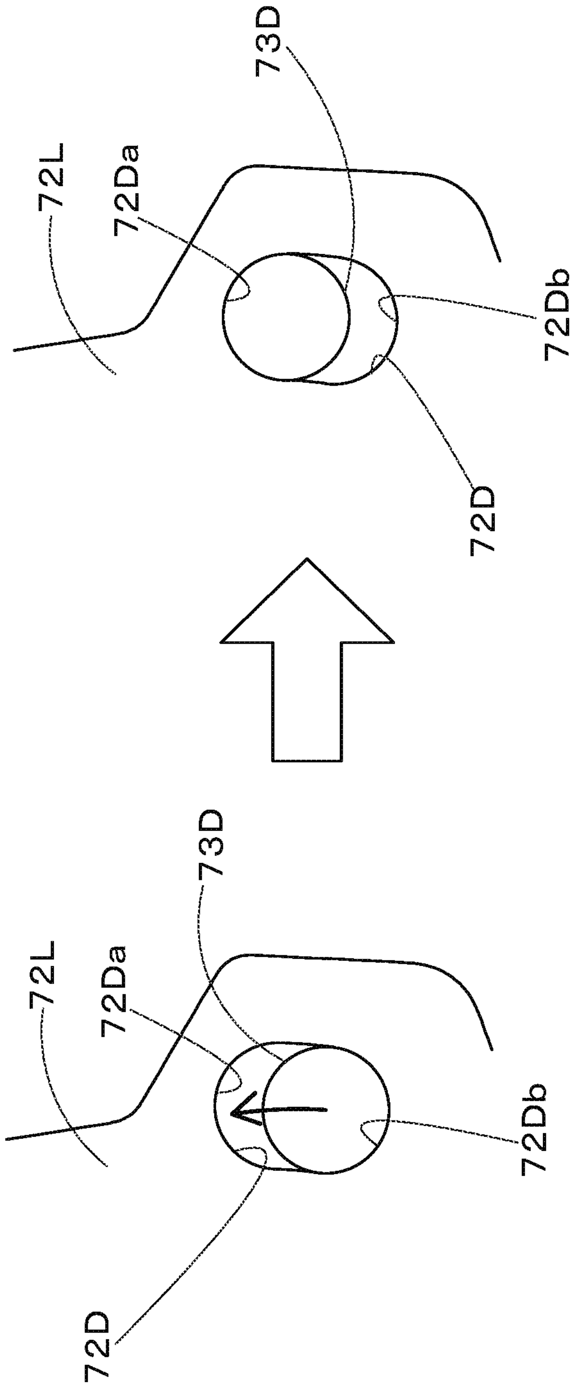
FIG. 5B shows side views illustrating the movement of the pin during transition from the raised position to the lowered position.

On the other hand, as illustrated in FIG. 15, when the unloading lever 73 and the movable bracket 72 are in the raised position P2, each first engagement portion 86 engages with (contacts) a corresponding fourth engagement surface 91*d* (pivot restrictor surface 93) of a corresponding second engagement recess 91B and the movable bracket 72 does not pivot, so that the unloading lever 73 pivots relative to movable bracket 72 when pivoting downward from the raised position P2. Specifically, when the unloading lever 73 is in the raised position P2, the pin 73D is at the second end 72Db of the guide slot 72D as illustrated in the left portion of FIG. 5B, and the pin 73D moves to the first end 72Da of the guide slot 72D as the unloading lever 73 pivots downward from the raised position P2 (see the right portion of FIG. 5B). This allows the unloading lever 73 to pivot relative to the movable bracket 72.

When each second engagement portion 88 disengages from a corresponding third engagement recess 91C and moves onto the left end face of the cam member 81, each second engagement recess 91B disengages from a corresponding first engagement portion 86, resulting in disengagement between the first engagement portions 86 and the second engagement recesses 91B, as indicated by dot-dot-dash line in FIG. 15. Upon disengagement between the first engagement portions 86 and the second engagement recesses 91B, the movable bracket 72 is allowed to pivot in the downward direction D2. That is, the unloading lever 73 pivots relative to the movable bracket 72 while the first engagement portions 86 and the cam member 81 (second engagement recess 91B) are about to be disengaged, and pivots together with the movable bracket 72 after the first engagement portions 86 and the cam member 81 are disengaged.

When the unloading lever 73 is pivoted from the lowered position P1 in the upward direction D1 to pivot the movable bracket 72 to the raised position P2, the movable bracket 72 is pivoted in the upward direction D1 by the biasing force of the gas spring 79, but when the unloading lever 73 is pivoted downward from the raised position P2 to pivot the movable bracket 72 to the lowered position P1, the unloading lever 73 causes the movable bracket 72 to pivot. That is, the force to pivot the unloading lever 73 downward is transmitted to the movable bracket 72 via the pin 73D, which pushes the movable bracket 72 down against the biasing force of the gas spring 79.

The mechanism in the present embodiment is configured such that the movable bracket 72 and the unloading lever 73 are pivotably supported on a single support shaft 77, and that the cam member 81, which engages with and disengages from the first engagement portions 86 on the movable bracket 72 and the second engagement portions 88 on the unloading lever 73, is attached to the support shaft 77, so that the movable bracket 72 is restricted to the lowered position P1 and the raised position P2 and such position restriction is released by pivoting the unloading lever 73 to allow the movable bracket 72 to pivot. This makes it possible to reduce the size and weight of the unloading lever device (lever device) 70. Therefore, a small biasing force of the gas spring 79 will suffice, making it possible to reduce the operating force of the unloading lever 73.

A lever device (unloading lever device) 70 according to one or more embodiments includes a base 71, a support shaft 77 provided on the base 71, a movable bracket 72 and a lever 73 which are supported on the support shaft 77 such that the movable bracket 72 and the lever 73 are pivotable between a lowered position P1 and a raised position P2, the raised position P2 being a position of the movable bracket 72 and the lever 73 pivoted upward from the lowered position P1, at least one first engagement portion 86 provided on the movable bracket 72, at least one second engagement portion 88 provided on the lever 73, a cam member 81 to engage with the at least one first engagement portion 86 and the at least one second engagement portion 88, the cam member 81 being attached to the support shaft 77 such that the cam member 81 is movable in a direction of an axis of the support shaft but not rotatable about the axis of the support shaft 77, and a biasing member 92 to bias the cam member 81 in a direction that allows the cam member 81 to engage with the at least one first engagement portion 86 and the at least one second engagement portion 88, wherein the at least one first engagement portion 86 is configured to, when the movable bracket and the lever are in the lowered position P1 and when the movable bracket and the lever are in the raised position P2, engage with the cam member 81 to restrict the movable bracket 72 from pivoting, and the at least one second engagement portion 88 is configured such that, when the lever 73 is caused to pivot upward from the lowered position P1 or pivot downward from the raised position P2, the at least one second engagement portion 88 causes the cam member 81 to move against the biasing member 92 to disengage the cam member 81 from the at least one first engagement portion 86.

This provides a mechanism in which the movable bracket 72 and the lever 73 are pivotally supported on the support shaft 77, the movable bracket 72 is provided with the at least one first engagement portion 86, the lever 73 is provided with the at least one second engagement portion 88, and the support shaft 77 has attached thereto the cam member 81 which engages with and disengages from the at least one first engagement portion 86 and the at least one second engagement portion 88, so that the movable bracket 72 is restricted to the lowered position P1 and the raised position P2 and such position restriction is released by pivoting the lever 73 to allow the movable bracket 72 to pivot. This makes it possible to reduce the size and weight of the lever device 70.

The cam member 81 may include engagement recesses 91 to receive the at least one first engagement portion 86 and the at least one second engagement portion 88 when the movable bracket and the lever are in the lowered position P1 and when the movable bracket and the lever are in the raised position P2. At least one of the engagement recesses 91 that receives the at least one first engagement portion 86 may include a pivot restrictor surface 93 to contact the at least one first engagement portion 86 to restrict the movable bracket 72 from pivoting. At least one of the engagement recesses 91 that receives the at least one second engagement portion 88 may include a cam surface 94 to allow the at least one second engagement portion 88 to slide thereon such that the cam member 81 moves against the biasing member 92 when the at least one second engagement portion 88 pivots together with the lever 73.

With this, it is possible to easily and compactly configure a mechanism that makes it possible to restrict the movable bracket 72 to the lowered position P1 and the raised position P2 and release such position restriction by pivoting of the lever 73 to allow the movable bracket 72 to pivot.

The engagement recesses 91 may include at least one first engagement recess 91A to receive the at least one first engagement portion 86 when the movable bracket and the lever are in the lowered position P1, at least one second engagement recess 91B to receive the at least one second engagement portion 88 when the movable bracket and the lever are in the lowered position P1, and at least one third engagement recess 91C which does not receive the at least one first engagement portion 86 or the at least one second engagement portion 88 when the movable bracket and the lever are in the lowered position P1. When the movable bracket and the lever are in the raised position P2, the at least one second engagement recess 91B may receive the at least one first engagement portion 86 and the at least one third engagement recess 91C may receive the at least one second engagement portion 88.

With this, since some engagement recesses 91 function also as different engagement recesses 91, it is possible to reduce the size of the cam member 81 and simplify the cam member 81.

The lever device may include a pair of the first engagement portions 86 and a pair of the second engagement portions 88. The pair of first engagement portions 86 may be arranged symmetrically to each other with respect to a center X2 of the support shaft. The pair of second engagement portions 88 may be arranged symmetrically to each other with respect to the center of the support shaft 77.

This makes it possible to cause the movable bracket 72 and the lever 73 to pivot stably.

The lever 73 may pivot relative to the movable bracket 72 while the at least one first engagement portion 86 and the cam member 81 are about to be disengaged, and pivot together with the movable bracket 72 after the at least one first engagement portion 86 and the cam member 81 are disengaged.

This makes it possible to move the movable bracket 72 to the lowered position P1 and to the raised position P2 by pivoting the lever 73 continuously.

The lever device may further include a guide slot 72D in one of the movable bracket 72 and the lever 73, and a pin 73D provided on the other of the movable bracket 72 and the lever 73 and inserted in the guide slot 72D. The guide slot 72D may be in the form of an arc centered on the axis of the support shaft 77. The lever 73 may pivot relative to the movable bracket 72 while the pin 73D is moving between a first end 72Da and a second end 72Db of the guide slot 72D, and the movable bracket 72 may pivot together with the lever 73 when the pin 73D is positioned at the first end 72Da or the second end 72Db of the guide slot 72D.

This makes it possible, using a simple configuration, to achieve a structure in which the lever 73 pivots relative to the movable bracket 72 while the at least one first engagement portion 86 and the cam member 81 are about to be disengaged and the lever 73 pivots together with the movable bracket 72 after the at least one first engagement portion 86 and the cam member 81 are disengaged.

The lever device 70 may be provided in or on the working machine 1.

The lever 73 may be an operation lock lever (unloading lever 73) to switch one or more actuators in or on the working machine 1 between an operable state and an inoperable state.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A lever device comprising:
a base;
a support shaft provided on the base;
a movable bracket and a lever which are supported on the support shaft such that the movable bracket and the lever are pivotable between a lowered position and a raised position, the raised position being a position of the movable bracket and the lever pivoted upward from the lowered position;
at least one first engagement portion provided on the movable bracket;
at least one second engagement portion provided on the lever;
a cam member to engage with the at least one first engagement portion and the at least one second engagement portion, the cam member being attached to the support shaft such that the cam member is movable in a direction of an axis of the support shaft but not rotatable about the axis of the support shaft; and
a biasing member to bias the cam member in a direction that allows the cam member to engage with the at least one first engagement portion and the at least one second engagement portion; wherein
the at least one first engagement portion is configured to, when the movable bracket and the lever are in the lowered position and when the movable bracket and the lever are in the raised position, engage with the cam member to restrict the movable bracket from pivoting; and
the at least one second engagement portion is configured such that, when the lever is caused to pivot upward from the lowered position or pivot downward from the raised position, the at least one second engagement portion causes the cam member to move against the biasing member to disengage the cam member from the at least one first engagement portion.

2. The lever device according to claim 1, wherein
the cam member includes engagement recesses to receive the at least one first engagement portion and the at least one second engagement portion when the movable bracket and the lever are in the lowered position and when the movable bracket and the lever are in the raised position;
at least one of the engagement recesses that receives the at least one first engagement portion includes a pivot restrictor surface to contact the at least one first engagement portion to restrict the movable bracket from pivoting; and
at least one of the engagement recesses that receives the at least one second engagement portion includes a cam surface to allow the at least one second engagement portion to slide thereon such that the cam member moves against the biasing member when the at least one second engagement portion pivots together with the lever.

3. The lever device according to claim 2, wherein
the engagement recesses include at least one first engagement recess to receive the at least one first engagement portion when the movable bracket and the lever are in the lowered position, at least one second engagement recess to receive the at least one second engagement portion when the movable bracket and the lever are in the lowered position, and at least one third engagement recess which does not receive the at least one first engagement portion or the at least one second engagement portion when the movable bracket and the lever are in the lowered position; and
when the movable bracket and the lever are in the raised position, the at least one second engagement recess receives the at least one first engagement portion and the at least one third engagement recess receives the at least one second engagement portion.

4. The lever device according to claim 1, wherein
the lever device includes a pair of the first engagement portions and a pair of the second engagement portions;
the pair of first engagement portions are arranged symmetrically to each other with respect to a center of the support shaft; and
the pair of second engagement portions are arranged symmetrically to each other with respect to the center of the support shaft.

5. The lever device according to claim 1, wherein
the lever pivots relative to the movable bracket while the at least one first engagement portion and the cam member are about to be disengaged, and pivots together with the movable bracket after the at least one first engagement portion and the cam member are disengaged.

6. The lever device according to claim 5, further comprising:
a guide slot in one of the movable bracket and the lever; and
a pin provided on the other of the movable bracket and the lever and inserted in the guide slot; wherein
the guide slot is in the form of an arc centered on the axis of the support shaft; and
the lever pivots relative to the movable bracket while the pin is moving between a first end and a second end of the guide slot, and the movable bracket pivots together with the lever when the pin is positioned at the first end or the second end of the guide slot.

7. A working machine comprising the lever device according to claim 1.

8. The working machine according to claim 7, wherein
the lever is an operation lock lever to switch one or more actuators in or on the working machine between an operable state and an inoperable state.

* * * * *